(12) United States Patent  (10) Patent No.: US 7,479,961 B2
Yamaguchi et al.  (45) Date of Patent: Jan. 20, 2009

(54) PROGRAM, INFORMATION STORAGE MEDIUM, AND IMAGE GENERATION SYSTEM

(75) Inventors: Kentaro Yamaguchi, Yokohama (JP); Yoshihito Saito, Machida (JP)

(73) Assignee: NAMCO BANDAI Games Inc., Tokyo (JP)

( * ) Notice: Subject to any disclaimer, the term of this patent is extended or adjusted under 35 U.S.C. 154(b) by 298 days.

(21) Appl. No.: 11/332,125

(22) Filed: Jan. 17, 2006

(65) Prior Publication Data
US 2006/0187223 A1 Aug. 24, 2006

(30) Foreign Application Priority Data
Jan. 17, 2005 (JP) ............................. 2005-009098

(51) Int. Cl.
*G06T 15/00* (2006.01)
(52) U.S. Cl. ....................... 345/426; 345/604
(58) Field of Classification Search ................. 345/426, 345/604
See application file for complete search history.

(56) References Cited
U.S. PATENT DOCUMENTS
6,537,153 B2 3/2003 Boku et al.
6,917,705 B2 * 7/2005 Sugiyama ................... 382/167

FOREIGN PATENT DOCUMENTS
JP A 2002-042156 2/2002
JP A 2003-085578 3/2003

* cited by examiner

*Primary Examiner*—Phu K Nguyen
(74) *Attorney, Agent, or Firm*—Oliff & Berridge, PLC

(57) ABSTRACT

An image generation system includes: a glare source drawing section which draws a glare source while referring to a Z value of an original image stored in a Z buffer to generate a first glare source image, and draws the glare source without referring to the Z value of the original image stored in the Z buffer to generate a second glare source image; a glare correction image generation section which performs image calculation processing including AND processing, of a first image which is an image obtained by subjecting the first glare source image to first blur processing and a second image which is one of an image obtained by subjecting the second glare source image to second blur processing and the second glare source image to generate a glare correction image; and a glare expression image generation section which generates a glare expression image based on the original image, the blurred image of the first glare source image, and the glare correction image.

21 Claims, 17 Drawing Sheets

FIRST BLUR PROCESSING (H1)

SECOND BLUR PROCESSING (H2)

FIG.9A

| 1 | 8 | 28 | 56 | 70 | 56 | 28 | 8 | 1 |
|---|---|---|---|---|---|---|---|---|
| 8 | 64 | 224 | 448 | 560 | 448 | 224 | 64 | 8 |
| 28 | 224 | 784 | 1568 | 1960 | 1568 | 784 | 224 | 28 |
| 56 | 448 | 1568 | 3136 | 3920 | 3136 | 1568 | 448 | 56 |
| 70 | 560 | 1960 | 3920 | 4900 | 3920 | 1960 | 560 | 70 |
| 56 | 448 | 1568 | 3136 | 3920 | 3136 | 1568 | 448 | 56 |
| 28 | 224 | 784 | 1568 | 1960 | 1568 | 784 | 224 | 28 |
| 8 | 64 | 224 | 448 | 560 | 448 | 224 | 64 | 8 |
| 1 | 8 | 28 | 56 | 70 | 56 | 28 | 8 | 1 |

E1 points to row 5. × 1/65536

FIG.9B

| 0 | 0 | 0 | 0 | 0 | 0 | 0 | 0 | 0 |
|---|---|---|---|---|---|---|---|---|
| 0 | 0 | 0 | 1 | 2 | 1 | 0 | 0 | 0 |
| 0 | 0 | 3 | 6 | 7 | 6 | 3 | 0 | 0 |
| 0 | 1 | 6 | 12 | 15 | 12 | 6 | 1 | 0 |
| 0 | 2 | 7 | 15 | 19 | 15 | 7 | 2 | 0 |
| 0 | 1 | 6 | 12 | 15 | 12 | 6 | 1 | 0 |
| 0 | 0 | 3 | 6 | 7 | 6 | 3 | 0 | 0 |
| 0 | 0 | 0 | 1 | 2 | 1 | 0 | 0 | 0 |
| 0 | 0 | 0 | 0 | 0 | 0 | 0 | 0 | 0 |

E2 points to row 5.

BLUR PROCESSING M1

CONVERSION PROCESSING OF
INCREASING PIXEL VALUE

BLUR PROCESSING M2

CONVERSION PROCESSING OF
INCREASING PIXEL VALUE

BLUR PROCESSING M3

FIG.12

| SHAPE OF GLARE SOURCE | THREE-DIMENSIONAL INFORMATION | DRAWING METHOD |
|---|---|---|
| SPHERE | CENTER COORDINATES RADIUS | DRAWS DISK BILLBOARD OBJECT CONTACTING FRONT SIDE(VIRTUAL CAMERA SIDE) OF SPHERE BY USING TRIANGLE FAN |
| CENTER COORDINATES | CENTER COORDINATES RADIUS NORMAL VECTOR | DRAWS DISK-SHAPED OBJECT BY USING TRIANGLE FAN |
| TRIANGLE STRIP | COORDINATES OF ALL VERTICES | DRAWS TRIANGLE STRIP |
| TRIANGLE FAN | COORDINATES OF ALL VERTICES | DRAWS TRIANGLE FAN |

PROGRAM, INFORMATION STORAGE MEDIUM, AND IMAGE GENERATION SYSTEM

Japanese Patent Application No. 2005-9098, filed on Jan. 17, 2005, is hereby incorporated by reference in its entirety.

BACKGROUND OF THE INVENTION

The present invention relates to a program, an information storage medium, and an image generation system.

An image generation system (game system) has been known which generates an image viewed from a virtual camera (given viewpoint) in an object space (virtual three-dimensional space) in which an object such as a character is disposed. Such an image generation system is very popular as a system which enables experience of so-called virtual reality.

In such an image generation system, it is desirable that a glare effect, which causes the outline of an object to be blurred due to light present behind the object, be realistically expressed in order to increase the virtual reality of the player.

A bright object or a bright area on the screen which produces glare is hereinafter called a "glare source". An object subjected to glare is hereinafter called a "glare target object". As expression which further increases the reality of an image using glare, the color of the glare target object positioned in front of the glare source (on the side of the viewpoint) may be made darker in the area subjected to glare. Such a dark expression is hereinafter called a "contrast".

JP-A-2002-42156 and JP-A-2003-85578 disclose technologies for generating an image in which such a glare (glow or halo) effect is expressed, for example.

However, these technologies do not allow expression of the glare contrast. Therefore, a realistic expression of the glare effect cannot be sufficiently achieved.

SUMMARY

A first aspect of the invention relates to a program for generating an image, the program causing a computer to function as:

a glare source drawing section which draws a glare source while referring to a Z value of an original image stored in a Z buffer to generate a first glare source image, and draws the glare source without referring to the Z value of the original image stored in the Z buffer to generate a second glare source image;

a glare correction image generation section which performs image calculation processing including AND processing of a first image which is an image obtained by subjecting the first glare source image to first blur processing and a second image which is one of an image obtained by subjecting the second glare source image to second blur processing and the second glare source image to generate a glare correction image; and a glare expression image generation section which generates a glare expression image in which a corrected glare effect is expressed in the original image based on the original image, the blurred image of the first glare source image, and the glare correction image.

A second aspect of the invention relates to a computer-readable information storage medium which stores the above program.

A third aspect of the invention relates to an image generation system which generates an image, the system comprising:

a glare source drawing section which draws a glare source while referring to a Z value of an original image stored in a Z buffer to generate a first glare source image, and draws the glare source without referring to the Z value of the original image stored in the Z buffer to generate a second glare source image;

a glare correction image generation section which performs image calculation processing including AND processing of a first image which is an image obtained by subjecting the first glare source image to first blur processing and a second image which is one of an image obtained by subjecting the second glare source image to second blur processing and the second glare source image to generate a glare correction image; and a glare expression image generation section which generates a glare expression image in which a corrected glare effect is expressed in the original image based on the original image, the blurred image of the first glare source image, and the glare correction image.

BRIEF DESCRIPTION OF THE SEVERAL VIEWS OF THE DRAWING

FIGS. 9A and 9B are diagrams illustrative of a problem occurring when performing blur processing two or more times.

FIG. 12 is a diagram illustrative of three-dimensional information of a glare source and a drawing method.

DETAILED DESCRIPTION OF THE EMBODIMENT

Figure 1:
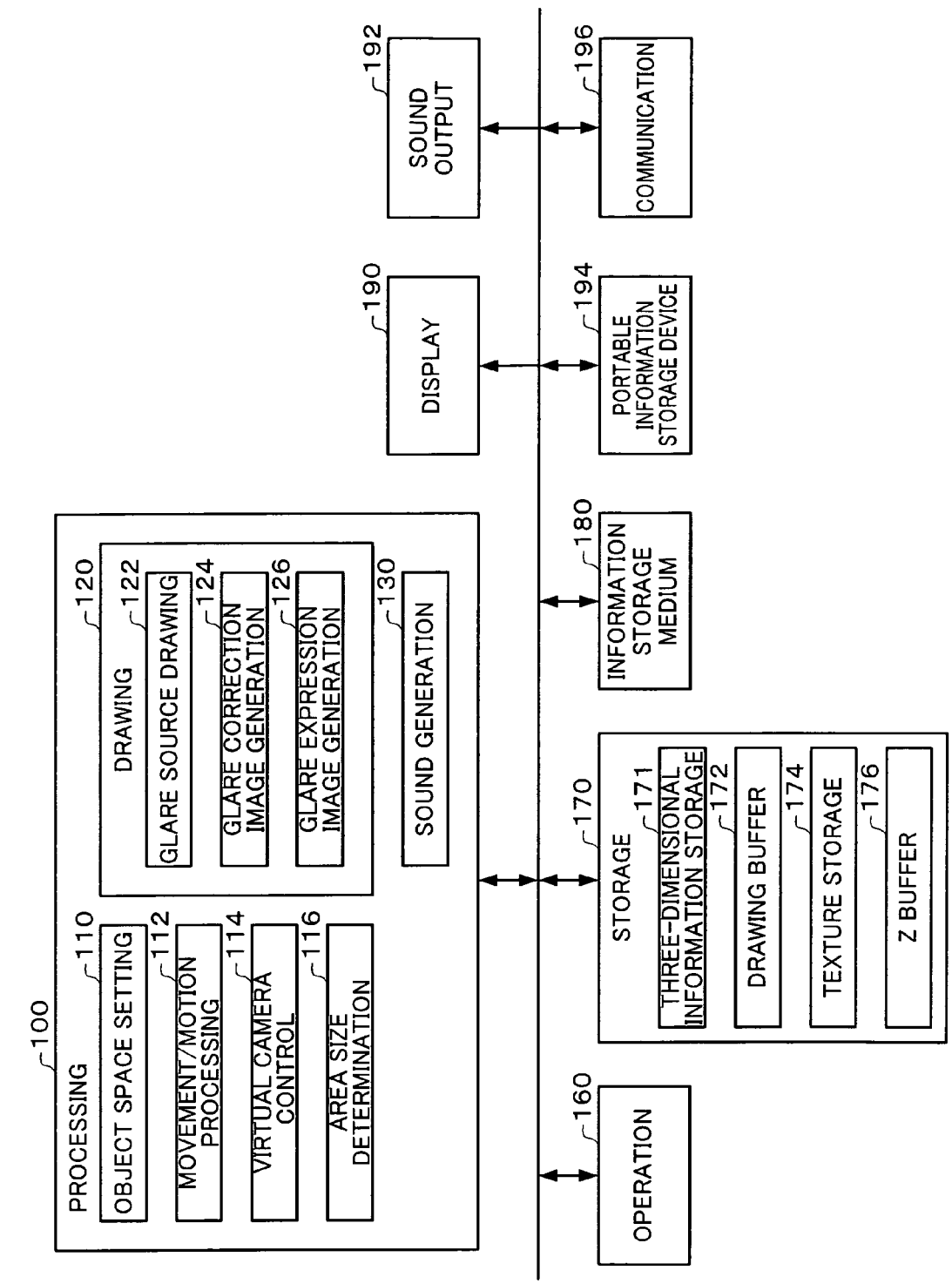
FIG. 1 is an example of a functional block diagram of an image generation system according to one embodiment of the invention.

The invention may provide a program, an information storage medium, and an image generation system capable of generating a more real glare expression image.

One embodiment of the invention provides an image generation system which generates an image, the system comprising:

a glare source drawing section which draws a glare source while referring to a Z value of an original image stored in a Z buffer to generate a first glare source image, and draws the glare source without referring to the Z value of the original image stored in the Z buffer to generate a second glare source image;

a glare correction image generation section which performs image calculation processing including AND processing of a first image which is an image obtained by subjecting the first glare source image to first blur processing and a second image which is one of an image obtained by subjecting the second glare source image to second blur processing and the second glare source image to generate a glare correction image; and a glare expression image generation section which generates a glare expression image in which a corrected glare effect is expressed in the original image based on the original image, the blurred image of the first glare source image, and the glare correction image.

One embodiment of the invention provides a program for causing a computer to function as the sections in the above embodiment.

One embodiment of the invention provides a computer-readable information storage medium which stores (records) a program for causing a computer to function as the sections in the above embodiment.

According to the above-described embodiments, the first glare source image is generated by drawing the glare source while referring to the Z value of the original image. The blurred image of the first glare source image is set as the first image. The second glare source image is generated by drawing the glare source without referring to the Z value of the original image. The blurred image of the second glare source image or the second glare source image is set as the second image. According to the above-described embodiments, the image calculation processing including the AND processing of the first and second images is performed to generate the glare correction image. The glare expression image is generated based on the original image, the blurred image of the first glare source image (the first image or the blurred image generated based on the first glare source image), and the glare correction image. This allows generation of a glare expression image in which the outline of the glare target object is eroded and blurred by the blurred image of the glare source. Moreover, the color of the glare target object positioned in front of the glare source can be made darker in the area subjected to glare, whereby a real glare expression image can be generated.

With the image generation system, program and information storage medium according to the above embodiment, the glare correction image generation section may perform the image calculation processing including NOT processing of the first glare source image to generate the glare correction image.

Note that the NOT processing may be omitted.

With the image generation system, program and information storage medium according to the above embodiment, the first blur processing and the second blur processing may be different types of blur processing.

With the image generation system, program and information storage medium according to the above embodiment, the first blur processing may be blur processing in which an amount of expansion of a blurred image with respect to a blur target image is larger than an amount of expansion of the second blur processing.

This enables the area in which the glare contrast is expressed to be set in an appropriate area.

With the image generation system, program and information storage medium according to the above embodiment, the first blur processing may include a plurality of blur processing, in which pixel values of a blurred image obtained by the Kth (K is a natural number) blur processing are subjected to conversion processing, and the subsequent (K+1)th blur processing may be performed for the blurred image subjected to the conversion processing.

This prevents occurrence of a problem in which the actual blur length becomes smaller than the blur length expected from the number of blur processing operations, so that efficient blur processing can be realized.

With the image generation system according to this embodiment, may include:

a three-dimensional information storage section which stores three-dimensional information of the glare source; and an area size determination section which determines an area size of a blur processing area based on the three-dimensional information of the glare source, and the glare correction image generation section may perform the blur processing of the glare source image in the blur processing area set by the area size.

The program and the information storage medium according to the above embodiment, causes the computer to function as:

a three-dimensional information storage section which stores three-dimensional information of the glare source; and an area size determination section which determines an area size of a blur processing area based on the three-dimensional information of the glare source, and the glare correction image generation section may perform the blur processing of the glare source image in the blur processing area set by the area size.

This allows the blur processing to be performed in the blur processing area which is set by the area size and is narrower than the screen size, so that the processing load can be reduced. Moreover, since the glare source is drawn based on the three-dimensional information of the glare source, occurrence of a malfunction in which the glare effect occurs in the area in which the glare source does not exist can be prevented.

With the image generation system, program and information storage medium according to the above embodiment, the three-dimensional information storage section may store center coordinates and a radius of a spherical glare source as the three-dimensional information; and the glare source drawing section may generate the glare source image by drawing a disk billboard object disposed at a position in front of the center coordinates when viewed from a virtual camera.

This allows generation of a real glare expression image of the spherical glare source such as the sun, moon, or a lamp.

With the image generation system, program and information storage medium according to the above embodiment, the three-dimensional information storage section may store center coordinates, radius, and normal vector indicating surface orientation of a disk-shaped glare source as the three-dimensional information; and the glare source drawing section may generate the glare source image by drawing a disk object which is disposed at the center coordinates and of which surface orientation is set by the normal vector.

This allows generation of a real glare expression image of the disk-shaped glare source such as an automotive headlight.

With the image generation system, program and information storage medium according to the above embodiment, the three-dimensional information storage section may store a plurality of vertex coordinates of the glare source as the three-dimensional information; and the glare source drawing section may generate the glare source image by drawing an object formed by vertices at the vertex coordinates.

This allows generation of a real glare expression image of the glare source having an arbitrary shape.

With the image generation system, program and information storage medium according to the above embodiment, the area size determination section may determines the size of the blur processing area by generating a bounding box which involves the glare source in a screen coordinate system based on the three-dimensional information of the glare source.

This enables the blur processing area size to be determined by simple processing.

Note that the embodiments described hereunder do not in any way limit the scope of the invention defined by the claims laid out herein. Note also that not all of the elements of these embodiments should be taken as essential requirements to the means of the present invention.

1. Configuration

FIG. 1 shows an example of a functional block diagram of an image generation system (game system) according to one embodiment of the invention. The image generation system according to one embodiment of the invention may have a configuration in which some of the constituent elements (sections) shown in FIG. 1 are omitted.

An operation section 160 allows a player to input operational data. The function of the operation section 160 may be realized by a lever, button, steering wheel, microphone, touch panel type display, casing, or the like. A storage section 170 functions as a work area for a processing section 100, a communication section 196, and the like. The function of the storage section 170 may be realized by a RAM (VRAM) or the like.

An information storage medium 180 (computer-readable medium) stores a program, data, and the like. The function of the information storage medium 180 may be realized by an optical disk (CD or DVD), hard disk, memory card, memory cassette, magnetic disk, memory (ROM), or the like. The processing section 100 performs various types of processing according to one embodiment of the invention based on a program (data) stored in the information storage medium 180. Specifically, a program for causing a computer to function as each section according to one embodiment of the invention (program for causing a computer to execute the processing procedure of each section) is stored in the information storage medium 180.

A display section 190 outputs an image generated according to one embodiment of the invention. The function of the display section 190 may be realized by a CRT, liquid crystal display device (LCD), touch panel type display, head mount display (HMD), or the like. A sound output section 192 outputs sound generated according to one embodiment of the invention. The function of the sound output section 192 may be realized by a speaker, headphone, or the like.

A portable information storage device 194 stores player's personal data, game save data, and the like. As the portable information storage device 194, a memory card, portable game device, and the like can be given. The communication section 196 performs various types of control for communicating with the outside (e.g. host device or another image generation system). The function of the communication section 196 may be realized by hardware such as a processor or communication ASIC, a program, or the like.

A program (data) for causing a computer to function as each section according to one embodiment of the invention may be distributed to the information storage medium 180 (storage section 170) from an information storage medium of a host device (server) through a network and the communication section 196. Use of the information storage medium of the host device (server) is also included within the scope of the invention.

The processing section 100 (processor) performs processing such as game processing, image generation processing, or sound generation processing based on operational data from the operation section 160, a program, and the like. As the game processing, processing of starting a game when game start conditions have been satisfied, proceeding with a game, disposing an object such as a character or a map, displaying an object, calculating game results, finishing a game when game end conditions have been satisfied, and the like can be given. The processing section 100 performs various types of processing using the storage section 170 as a work area. The function of the processing section 100 may be realized by hardware such as a processor (e.g. CPU or DSP) or ASIC (e.g. gate array) and a program.

The processing section 100 includes an object space setting section 110, a movement/motion processing section 112, a virtual camera control section 114, an area size determination section 116, a drawing section 120, and a sound generation section 130. The processing section 100 may have a configuration in which some of these sections are omitted.

The object space setting section 110 disposes (sets) various objects (objects formed by a primitive surface such as a polygon, free-form surface, or subdivision surface) representing display objects such as a character, car, tank, building, tree, pillar, wall, or map (topography) in an object space. Specifically, the object space setting section 110 determines the position and the rotational angle (synonymous with orientation or direction) of an object (model object) in a world coordinate system, and disposes the object at the determined position (X, Y, Z) and the determined rotational angle (rotational angles around X, Y, and Z axes).

The movement/motion processing section 112 calculates the movement/motion (movement/motion simulation) of an object (e.g. character, car, or airplane). Specifically, the movement/motion processing section 112 causes an object (moving object) to move in the object space or to make a motion (animation) based on the operational data input by the player using the operation section 160, a program (movement/motion algorithm), various types of data (motion data), and the like. In more detail, the movement/motion processing section 112 performs simulation processing of sequentially calculating object's movement information (position, rotational angle, speed, or acceleration) and motion information (position or rotational angle of each part object) in units of frames (1/60 sec). The frame rate is the time unit for performing the movement/motion processing (simulation processing) of an object or the image generation processing.

The virtual camera control section 114 controls a virtual camera (viewpoint) for generating an image viewed from a given (arbitrary) viewpoint in the object space. In more detail, the virtual camera control section 114 controls the position (X, Y, Z) or the rotational angle (rotational angles around X, Y, and Z axes) of the virtual camera (processing of controlling the viewpoint position or the line-of-sight direction).

For example, when imaging an object (e.g. character, ball, or car) from behind using the virtual camera, the virtual camera control section 114 controls the position or the rotational angle (orientation) of the virtual camera so that the virtual camera follows a change in the position or the rotation of the object. In this case, the virtual camera control section 114 may control the virtual camera based on information such as the position, rotational angle, or speed of the object obtained by the movement/motion processing section 112. Or, the virtual camera control section 114 may rotate the virtual camera at a predetermined rotational angle or move the virtual camera along a predetermined path. In this case, the virtual camera control section 114 controls the virtual camera based on virtual camera data for specifying the position (moving path) or the rotational angle of the virtual camera.

The area size determination section 116 determines the size of an area in which blur processing is performed. In more detail, a three-dimensional information storage section 171 stores three-dimensional information of a glare source or the like. The three-dimensional information of the glare source may include positional information and shape information of the glare source. The area size determination section 116 determines the area size of the blur processing area based on the three-dimensional information of the glare source read from the three-dimensional information storage section 171. In more detail, the area size determination section 116 calculates the coordinates (e.g. vertex coordinates) of the glare source in a screen coordinate system, and determines the position and the size of the processing area on a screen. The area size may be determined by generating a bounding box which involves the glare source in the screen coordinate system based on the three-dimensional information of the glare source, for example.

For example, when the glare source is set (presumed) in a spherical shape, the center coordinates and the radius of the glare source are stored in the three-dimensional information storage section 171 as three-dimensional information. The area size determination section 116 determines the area size of the blur processing area based on the center coordinates and the radius. When the glare source is set in a disk shape, the center coordinates, radius, and normal vector (normal vector indicating the orientation of the surface of the disk) of the glare source are stored in the three-dimensional information storage section 171 as three-dimensional information. The area size determination section 116 determines the area size of the blur processing area based on the center coordinates, radius, and normal vector. When the glare source is set as an object in an arbitrary shape formed by a plurality of vertices (e.g. triangle strip or triangle fan), the vertex coordinates of the glare source are stored in the three-dimensional information storage section 171 as three-dimensional information. The area size determination section 116 determines the area size of the blur processing area based on the vertex coordinates.

The drawing section 120 performs drawing processing based on results of various types of processing (game processing) performed by the processing section 100 to generate an image, and outputs the image to the display section 190. When generating a three-dimensional game image, geometric processing such as coordinate transformation (world coordinate transformation or camera coordinate transformation), clipping processing, or perspective transformation is performed, and drawing data (e.g. positional coordinates of vertices of primitive surface, texture coordinates, color data, normal vector, or α value) is created based on the processing results. An object (one or more primitive surfaces) after perspective transformation (after geometric processing) is drawn in a drawing buffer 172 (buffer which can store image information in pixel units, such as a frame buffer or a work buffer; VRAM) based on the drawing data (primitive surface data). This causes an image viewed from the virtual camera (given viewpoint) to be generated in the object space.

The drawing section 120 may perform texture mapping, hidden surface removal, or α blending.

The texture mapping is processing of mapping a texture (texel value) stored in a texture storage section 174 onto the object. In more detail, the drawing section 120 reads a texture (surface properties such as color and α value) from the texture storage section 174 using the texture coordinates set (assigned) to the vertices of the object (primitive surface) or the like. The drawing section 120 maps the texture (two-dimensional image or pattern) onto the object. In this case, the drawing section 120 associates the pixel with the texel and performs bilinear interpolation (texel interpolation) or the like.

The hidden surface removal is realized by a Z buffer method (depth comparison method or Z test) using a Z buffer 176 (depth buffer) in which the Z value (depth information) of each pixel is stored, for example. Specifically, the drawing section 120 refers to the Z value stored in the Z buffer 176 when drawing each pixel of the primitive surface of the object. The drawing section 120 compares the Z value in the Z buffer 176 and the Z value of the drawing target pixel of the primitive surface, and, when the Z value of the drawing target pixel is the Z value in front of the virtual camera (e.g. large Z value), draws that pixel and updates the Z value in the Z buffer 176 with a new Z value.

The α blending is performed based on the α value (A value), and is generally divided into normal α blending, additive α blending, subtractive α blending, and the like. In the case of normal α blending, the drawing section 120 performs processing indicated by the following equations.

$$R_Q = (1-a) \times R_1 + a \times R_2$$

$$G_Q = (1-a) \times G_1 + a \times G_2$$

$$B_Q = (1-a) \times B_1 + a \times B_2$$

In the case of additive α blending, the drawing section 120 performs processing indicated by the following equations.

$$R_Q = R_1 + a \times R_2$$

$$G_Q = G_1 + a \times G_2$$

$$B_Q = B_1 + a \times B_2$$

In the case of subtractive α blending, the drawing section 120 performs processing indicated by the following equations.

$$R_Q = R_1 - a \times R_2$$

$$G_Q = G_1 - a \times G_2$$

$$B_Q = B_1 - a \times B_2$$

$R_1$, $G_1$, and $B_1$ are RGB components of the image (original image) which has been drawn in the drawing buffer 172 (frame buffer), and $R_2$, $G_2$, and $B_2$ are RGB components of the image to be drawn in the drawing buffer 172. $R_Q$, $G_Q$, and $B_Q$ are RGB components of the image obtained by α blending. The α value is information which can be stored while being associated with each pixel (texel or dot), and is additional information other than color information. The α value may be used as translucency (equivalent to transparency or opacity) information, mask information, bump information, or the like.

The drawing section 120 includes a glare source drawing section 122, a glare correction image generation section 124, and a glare expression image generation section 126. The drawing section 120 may have a configuration in which some of these sections are omitted.

The glare source drawing section 122 draws the glare source based on the three-dimensional information of the glare source stored in the three-dimensional information storage section 171. In more detail, the Z value of the original image has been stored in the Z buffer 176 when generating the original image. The glare source drawing section 122 draws the glare source while referring to the Z value of the original image stored in the Z buffer 176 (enabling the Z test) and performing hidden surface removal by the Z buffer method to generate a first glare source image. This enables the area of the glare source hidden by the glare target object of the original image when viewed from the virtual camera to be appropriately subjected to hidden surface removal. The glare source drawing section 122 draws the glare source without referring to the Z value of the original image stored in the Z buffer 176 (disabling the Z test) to generate a second glare source image. In the above processing, the Z value is not updated differing from a known Z buffer method.

For example, when the glare source is set in a spherical shape, the glare source drawing section 122 draws a disk billboard object disposed at a position in front of the center coordinates of the sphere when viewed from the virtual camera (e.g. position in contact with the sphere) to generate a glare source image (first and second glare source images). The billboard object used herein refers to an object disposed so that its surface is always perpendicular to the virtual camera. When the glare source is set in a disk shape, the glare source drawing section 122 draws a disk object disposed at the center coordinates and facing the direction set by the normal vector to generate a glare source image. When the glare source is set as an object formed by a plurality of vertices (e.g. triangle strip or triangle fan), the glare source drawing section 122 draws an object formed by the vertices at the vertex coordinates to generate a glare source image.

The glare correction image generation section 124 generates a glare correction image. In more detail, the glare correction image generation section 124 performs image calculation processing including AND processing of a first image (first stencil) obtained by subjecting the first glare source image to first blur processing and a second image (second stencil) obtained by subjecting the second glare source image to second blur processing to generate a glare correction image (glare correction stencil).

The second image may be the second glare source image without being subjected to the second blur processing. The image calculation processing performed by the glare correction image generation section 124 may include NOT processing of the first glare source image (subtracting the first glare source image from the AND of the first and second images).

The first blur processing and the second blur processing performed by the glare correction image generation section 124 may be the same type of blur processing, but are preferably different types of blur processing. In more detail, the first blur processing may be blur processing in which the amount of expansion (length of expansion) of the blurred image (blurred image of the glare source image) with respect to the blur target image (original glare source image) is larger than the amount of expansion of the second blur processing. Specifically, the first blur processing is made up of a plurality of blur processing. The pixel values of the blurred image obtained by the Kth blur processing (M1) may be subjected to conversion processing, and the subsequent (K+1)th blur processing (M2) may be performed for the blurred image subjected to the conversion processing.

The blur processing (first and second blur processing) of the glare source image (first and second glare source images) may be performed in the blur processing area set by the area size determined by the area size determination section 116. Specifically, the blur processing of the glare source image is performed in the blur processing area to generate the blurred image (a plane or blur information) of the glare source. The blurred image of the glare source may be generated by one blur processing, or may be generated by repeatedly performing the blur processing a number of times. The blur processing may be realized by shifting the texture coordinates and mapping a texture by a bilinear interpolation method (texel interpolation method), for example. The blur processing may also be realized by another method using a video filter or the like.

The glare expression image generation section 126 generates a glare expression image. In more detail, the glare expression image generation section 126 generates a glare expression image in which the glare effect is expressed in the original image based on the original image and the blurred image (a plane or blur information) of the first glare source image. Specifically, the glare expression image generation section 126 generates a glare expression image in which the outline of the glare target object is eroded and blurred by glare light. In more detail, the glare expression image generation section 126 generates a glare expression image in which the corrected glare effect is expressed in the original image based on the original image, the blurred image of the first glare source image, and the glare correction image. Specifically, the glare expression image generation section 126 generates a glare expression image in which the glare contrast is expressed.

The glare expression image generation section 126 may convert the blurred image (a value) using a given conversion table (e.g. lookup table for index color texture mapping), and generate the glare expression image based on the original image and the blurred image (a value) after the conversion processing.

When the glare source drawing section 122 has drawn the glare source using the a value (when the glare source drawing section 122 has drawn the glare source in the a plane of the drawing buffer 172), the blur processing is performed for the a value of the drawn glare source image to generate the a value subjected to the blur processing. The glare expression image generation section 126 performs a blending between the original image and the glare color (glare image information) based on the a value (a plane) subjected to the blur processing to generate the glare expression image.

The sound generation section 130 performs sound processing based on the results of various types of processing performed by the processing section 100 to generate game sound such as background music (BGM), effect sound, or voice, and outputs the game sound to the sound output section 192.

The image generation system according to one embodiment of the invention may be a system dedicated to a single player mode in which only one player can play a game, or may be a system provided with a multi-player mode in which two or more players can play a game. When two or more players play a game, game images and game sound provided to the players may be generated using one terminal, or may be generated by distributed processing using two or more terminals (game device or portable telephone) connected through a network (transmission line or communication line), for example.

2. Method of Embodiment

A method according to one embodiment of the invention is described below with reference to the drawings.

2.1 Generation of Glare Expression Image

In one embodiment of the invention, the glare processing for generating the glare expression image is performed by post processing. Specifically, the glare processing is performed after drawing all objects (e.g. glare target object and glare source). In more detail, the original image is generated by subjecting the object to geometric processing (coordinate transformation such as perspective transformation) and drawing (rendering) the object (polygon) after the geometric processing in the frame buffer (drawing area or drawing buffer in a broad sense), and the glare processing is performed for the original image. Therefore, the Z value (depth information) of the object (original image) including the glare target object has been stored in the Z buffer when starting the glare processing.

Figure 2:
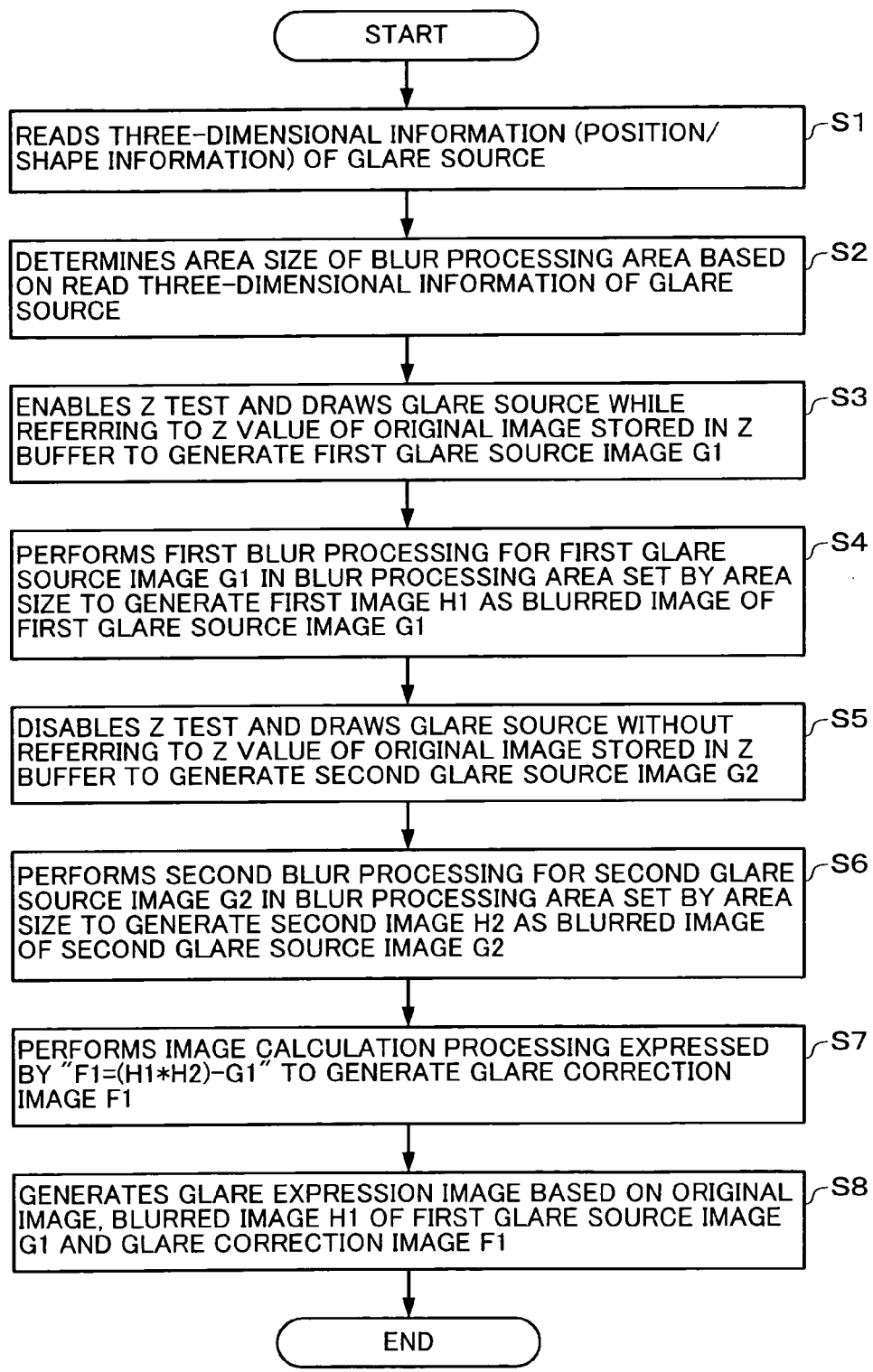
FIG. 2 is a flowchart of processing of a method according to one embodiment of the invention.

FIG. 2 is a flowchart showing an outline of the glare processing according to one embodiment of the invention.

First, the three-dimensional information (position/shape information) of the glare source is read from the three-dimensional information storage section (step S1). For example, when the glare source is a sphere, the center coordinates and the radius of the sphere are read as the three-dimensional information. The area size of the blur processing area is determined based on the read three-dimensional information of the glare source (step S2). In more detail, the coordinates of the glare source in the screen coordinate system (on the screen) are calculated to determine the position and the size of the processing area on the screen.

Then, the Z test is enabled, and the glare source is drawn while referring to the Z value of the original image stored in the Z buffer to generate a first glare source image G1 (step S3). The first blur processing is performed for the first glare source image G1 in the blur processing area set (allocated) by the area size determined in the step S2 to generate a first image H1 as the blurred image of the first glare source image G1 (step S4).

Then, the Z test is disabled, and the glare source is drawn without referring to the Z value of the original image stored in the Z buffer to generate a second glare source image G2 (step S5). The second blur processing is performed for the second glare source image G2 in the blur processing area set by the area size determined in the step S2 to generate a second image H2 as the blurred image of the second glare source image G2 (step S6).

Then, image calculation processing expressed by "F1=(H1*H2)−G1" is performed to generate a glare correction image F1 (step S7). Specifically, the glare correction image F1 is generated by performing the image calculation processing including the AND processing of the first and second images H1 and H2 (H1*H2) and NOT processing of the first glare source image G1 (−G1). A glare expression image in which the corrected glare effect is expressed in the original image is generated based on the original image, the blurred image (H1) of the first glare source image G1, and the glare correction image F1 (step S8).

Figure 3:
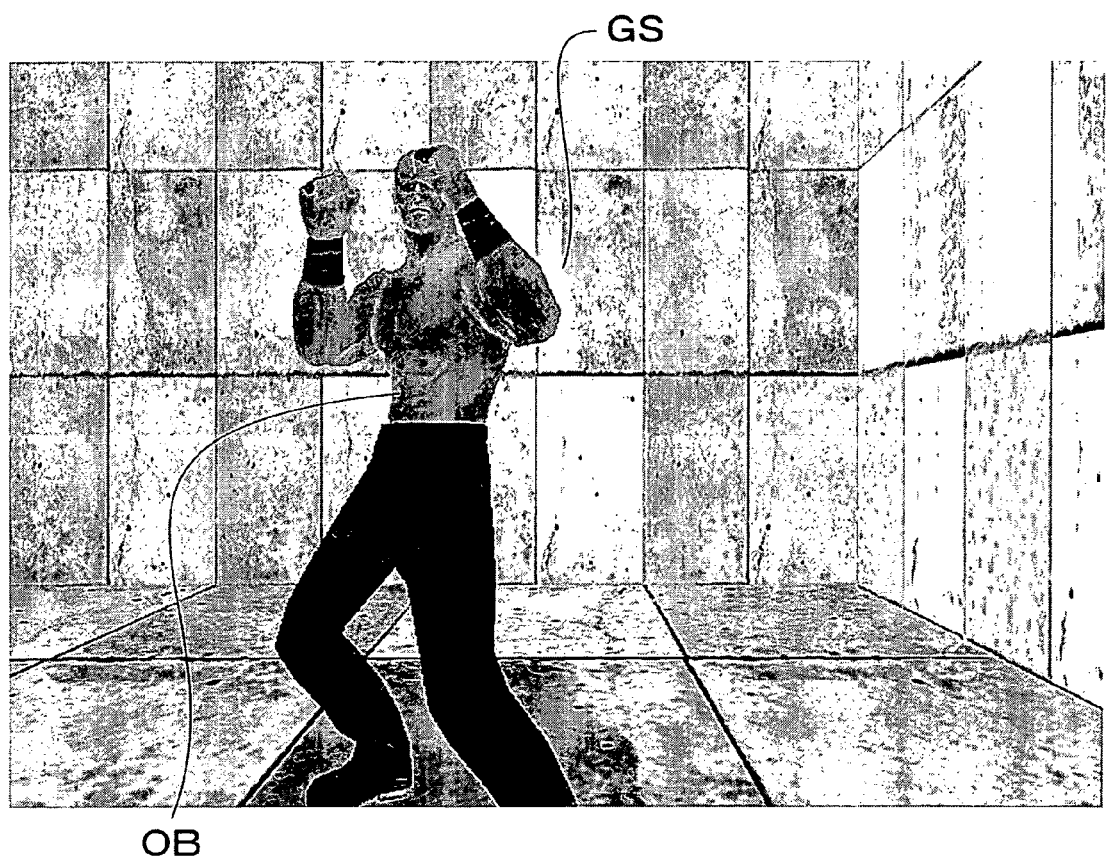
FIG. 3 is an example of an original image.

FIG. 3 shows an example of the original image. OB indicates the glare target object, and GS indicates the glare source. In this game scene, a character which is the glare target object OB stands in a room, and light leaks from the glare source GS which is the area of a hole formed in the wall of the room. In the original image shown in FIG. 3, the area of the glare source GS hidden by the glare target object OB is eliminated by hidden surface removal.

Figure 4:
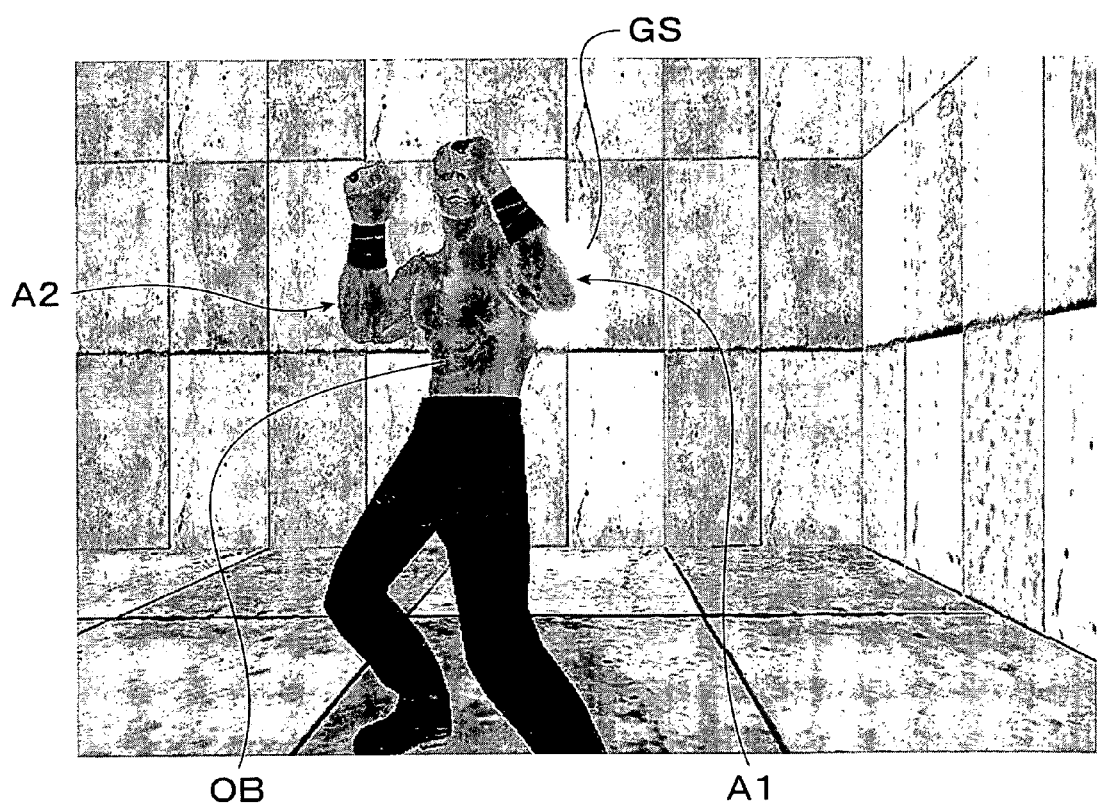
FIG. 4 is an example of a glare expression image in which contrast expression correction has not been performed.

FIG. 4 shows an example of the glare expression image. FIG. 4 shows an example of the glare expression image in which the glare contrast expression correction has not been performed. In FIG. 4, an image is generated in which the outline of the glare target object OB is eroded and blurred by the light from the glare source GS, as indicated by A1. Specifically, a glare expression image is generated in which the light from the glare source GS is positioned in front of the glare target object OB.

As an example of a glare processing method differing from the method according to one embodiment of the invention, an automatic extraction method in which the glare processing is performed using a bright area on the screen as the glare source can be given. The glare processing method according to one embodiment of the invention has the following advantages over the automatic extraction method.

First, the method according to one embodiment of the invention imposes low processing load. Specifically, while the automatic extraction method processes the entire screen, the method according to one embodiment of the invention processes only a limited area on the screen (see steps S2 and S4, for example). Therefore, the processing load can be reduced. Second, the method according to one embodiment of the invention can process a desired glare source. In the automatic extraction method, an area undesirable as the glare source may be processed as the glare source. According to one embodiment of the invention, since the position of the glare source and the like are specified based on the three-dimensional information, such a malfunction does not occur.

2.2 Glare Contrast Expression

The sensitivity of the human eye decreases when seeing a light spot, and increases when seeing a dark spot. Therefore, the reality of the image shown in FIG. 4 can be further increased by causing the color of an area A1 of the glare target object OB positioned in a bright area to be darker than the color of an area A2 of the glare target object OB positioned in a dark area.

In one embodiment of the invention, the contrast which is the glare dark expression is realized by the processing shown in FIG. 2.

Figure 5:
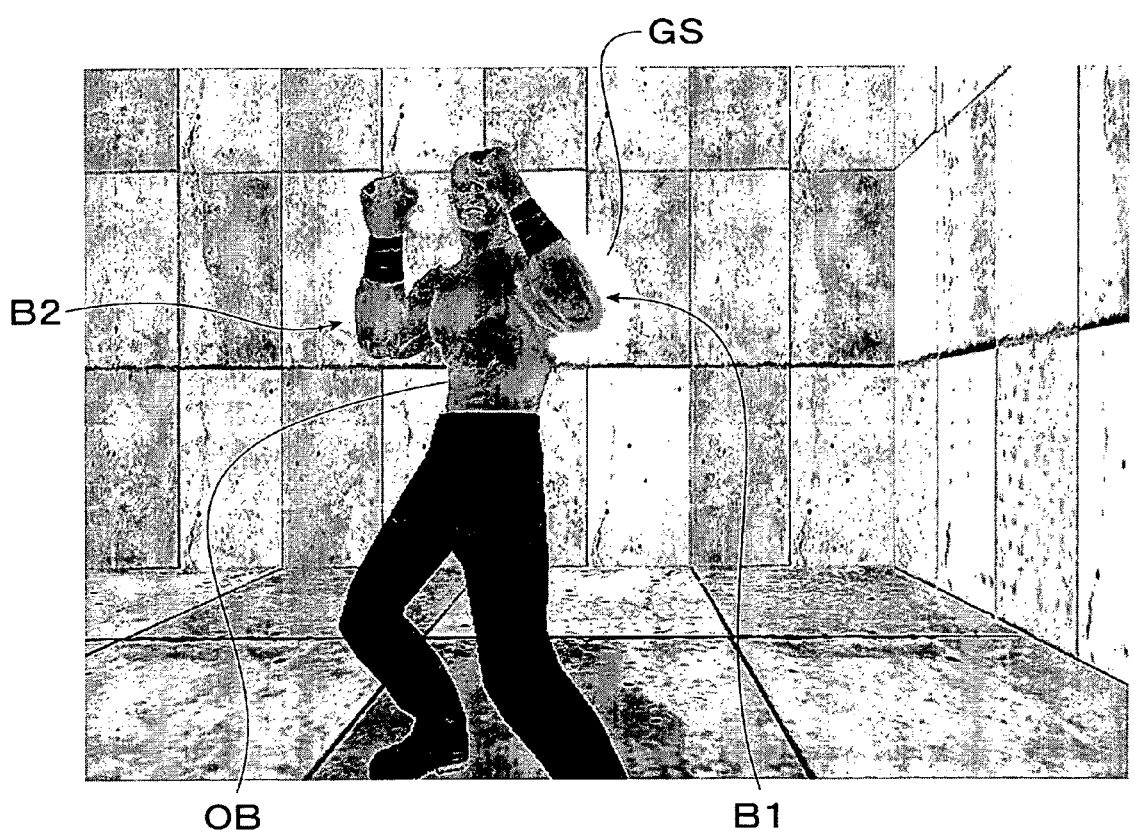
FIG. 5 is an example of a glare expression image in which contrast expression correction has been performed.

FIG. 5 shows an example of the glare expression image in which the glare contrast expression correction has been performed. In FIG. 5, the color of an area B1 of the glare target object OB positioned in front of the glare source GS and subjected to glare is darker than the color of an area B2 of the glare target object OB to effectively provide the glare contrast expression.

A glare contrast expression method according to one embodiment of the invention is described below with reference to FIGS. 6, 7A, and 7B. For example, when realizing the glare contrast expression using a contrast expression object or the like, glare may not be correctly drawn depending on the shapes and the positional relationship of the glare source, the glare target object, and the contrast expression object. In one embodiment of the invention, occurrence of such a problem is prevented by limiting the drawing range of the glare contrast inside (almost inside) the shape of the glare source.

Figure 6:
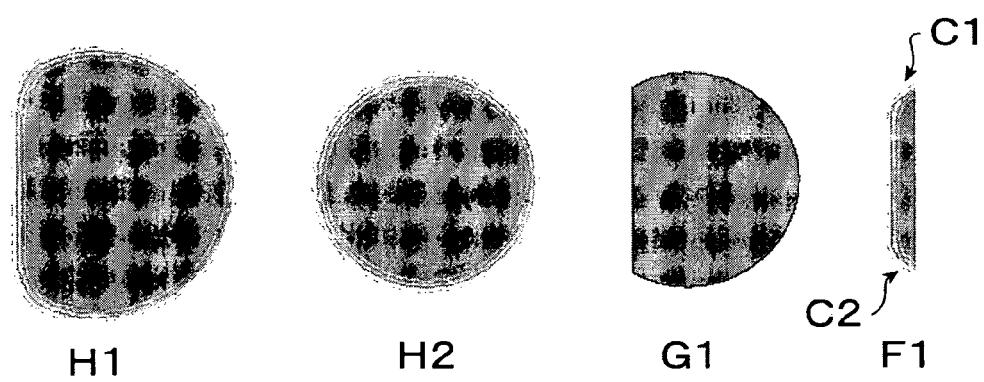
FIG. 6 is a diagram illustrative of a glare contrast expression method according to one embodiment of the invention.
Figure 7A:
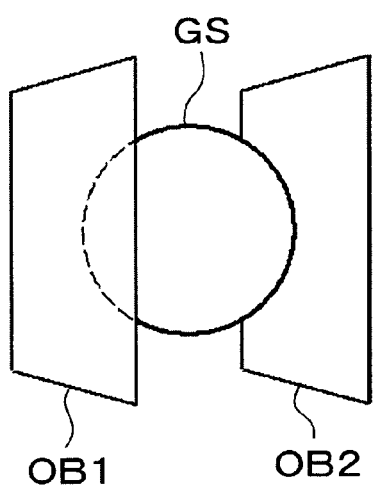
FIGS. 7A and 7B are diagrams illustrative of a glare contrast expression method according to one embodiment of the invention.

In more detail, when glare target objects OB1 and OB2 and the glare source GS are disposed as shown in FIG. 7A, the glare source is drawn after enabling the Z test, and the first blur processing is performed for the resulting first glare source image G1 to generate the first image H1 (stencil) as the blurred image of the first glare source image G1, as shown in FIG. 6 (steps S3 and S4 in FIG. 2).

The glare source is drawn after disabling the Z test, and the second blur processing is performed for the resulting second glare source image G2 (not shown) to generate the second image H2 (stencil) which is an image obtained by blurring the edge of the second glare source image G2 (steps S5 and S6 in FIG. 2).

Then, the image calculation processing expressed by "F1=(H1*H2)−G1" is performed to generate the glare correction image F1 (step S7 in FIG. 2). Specifically, the common area of the first and second images H1 and H2 is extracted by performing the AND processing of the first and second images H1 and H2 (H1*H2) so that the drawing range of the glare contrast can be limited inside the shape of the glare source. The glare correction image F1 shown in FIG. 6 can be generated by performing the NOT processing (subtraction processing) of the first glare source image G1 for the image obtained by the AND processing (H1*H2).

Figure 7B:
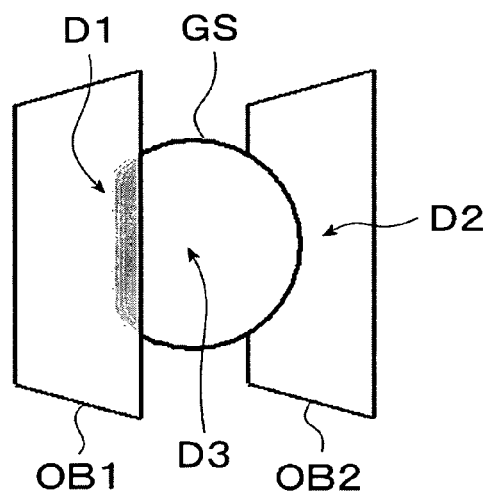

The generated glare correction image F1 (e.g. glare color or white) is drawn in the frame buffer, in which the original image (FIG. 7A) has been drawn, by subtraction (subtractive a blending) so that black contrast can be drawn as indicated by D1 in FIG. 7B. Then, the blurred image of the glare source image set in the glare color (e.g. the first image H1 or the converted image of the first image H1) is drawn in the frame buffer by blending (additive a blending) to generate the image as shown in FIG. 5.

In one embodiment of the invention, the drawing range of the glare contrast is limited inside the shape of the glare source by performing the AND processing of the first and second images H1 and H2. Therefore, even in the case shown in FIG. 7A, the contrast can be drawn on the glare target object OB1 positioned in front of the glare source GS only in the area D1 subjected to the glare, as shown in FIG. 7B. Specifically, it is possible to prevent the contrast from being drawn in an area D2 of the glare target object OB2 positioned behind the glare source GS.

The above description illustrates the case of drawing the glare correction image F1 set in the glare color, white, or the like in the frame buffer by subtraction (subtractive a blending). Note that the glare correction image F1 set in black or the like may be drawn in the frame buffer by blending (normal a blending).

The image calculation processing according to one embodiment of the invention is not limited to the image calculation processing expressed by "F1=(H1*H2)−G1". For example, the NOT processing of the first glare source image G1 (−G1) may be omitted depending on the color of glare or combination with other effects. Specifically, the black contrast remains in the area indicated by D3 in FIG. 7B when omitting the NOT processing of the first glare source image G1. However, if the area indicated by D3 can be made sufficiently brighter by the blurred image of the glare source image drawn thereafter, the NOT processing of the first glare source image G1 can be omitted.

In one embodiment of the invention, image calculation processing logically equivalent to "F1=(H1*H2)−G1" may be performed. As an example of the image calculation processing logically equivalent to "F1=(H1*H2)−G1", "F1=H1*(H2−G1)" can be given. This is because the following expression is satisfied.

$$H1 * (H2 - G1) = H1 \text{ AND } (H2 \text{ AND } (\text{NOT } G1))$$
$$= (H1 \text{ AND } H2) \text{ AND } (\text{NOT } G1)$$
$$= (H1 * H2) - G1$$

In FIG. 6, the blurred image of the second glare source image G2 is used as the second image H2. The second glare source image G2 which is not subjected to the blur processing may also be used as the second image H2. Specifically, since the edge of the contrast indicated by C1 and C2 in FIG. 6 can be blurred by using the blurred image as the second image H2, the quality of the generated image can be increased. However, when it is unnecessary to blur the edge of the contrast indicated by C1 and C2 in FIG. 6, the second glare source image G2 may be directly used as the second image H2.

2.3 Blur Processing

It is preferable that the first blur processing and the second blur processing of blurring the first and second images H1 and H2 shown in FIG. 6 be different types of blur processing. In more detail, it is preferable that the first blur processing for the first image H1 be blur processing in which the amount of expansion of the blurred image with respect to the blur target image is larger than the amount of expansion of the second blur processing.

Figure 8A:
FIGS. 8A to 8C are diagrams illustrative of blur processing.
Figure 8B:
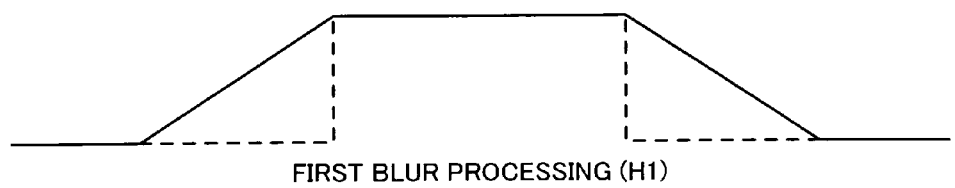
Figure 8C:
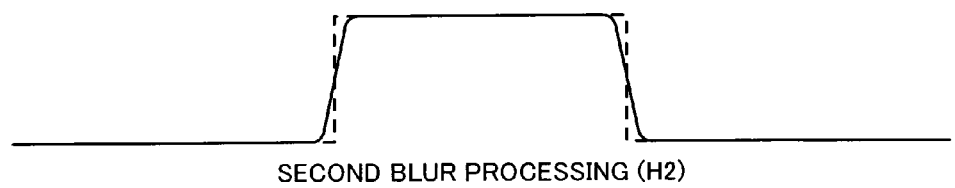

When blurring the blur target image (first and second glare source images) shown in FIG. 8A, the amount of expansion (blur length) from the area of the blur target image toward the outside is larger in the first blur processing shown in FIG. 8B than the second blur processing shown in FIG. 8C.

Specifically, the contrast is added to glare which extends to a large extent toward the outside of the glare source. Therefore, it is preferable that the first blur processing for the first image H1 be blur processing in which the amount of expansion toward the outside is large, as shown in FIG. 8B. On the other hand, the second image H2 is used to limit the drawing range of the glare contrast inside the shape of the glare source. Therefore, it is preferable that the second blur processing for the second image H2 be blur processing in which the amount of expansion toward the outside is small, as shown in FIG. 8C. Specifically, it is preferable that the second blur processing be blur processing in which the blur length from the area of the blur target image toward the outside is small.

The details of the blur processing according to one embodiment of the invention are described below. In one embodiment of the invention, the blur processing is performed a number of times in order to increase the blur length of the blurred image. In more detail, work buffers WBUF1 and WBUF2 used for the blur processing are allocated on a VRAM.

A blur processing target image is drawn in the work buffer WBUF1. The image drawn in the work buffer WBUF1 is used as a texture, and a polygon (sprite) onto which the texture is mapped and which has the same size as the texture is drawn in the work buffer WBUF2. In this case, bilinear interpolation is performed by causing the pixel center to correspond to the center of four texels. Specifically, the texture coordinates are shifted, and the texture is mapped by the bilinear interpolation method. As a result, an image obtained by blurring the image drawn in the work buffer WBUF1 in an amount of 0.5 pixels is drawn in the work buffer WBUF2.

Then, the image drawn in the work buffer WBUF2 is used as a texture, and a polygon (sprite) onto which the texture is mapped and which has the same size as the texture is drawn in the work buffer WBUF1. In this case, bilinear interpolation is performed by causing the pixel center to correspond to the center of four texels. Specifically, the texture coordinates are shifted, and the texture is mapped by the bilinear interpolation method. As a result, an image obtained by blurring the image drawn in the work buffer WBUF2 in an amount of 0.5 pixels is drawn in the work buffer WBUF1.

The image drawn in the work buffer WBUF1 becomes an image in which the blur target image is blurred in an amount of one pixel by performing the drawing processing from the work buffer WBUF1 to the work buffer WBUF2 and the drawing processing from the work buffer WBUF2 to the work buffer WBUF1. When a desired blur length is N pixels, the blur processing may be repeatedly performed N times.

When the blurred image is generated by utilizing bilinear interpolation or the like, the efficiency of the blur processing is decreased as the number of times of the blur processing is increased (as the blur length is increased).

FIG. 9A is a diagram showing the distribution of the original pixel value to peripheral pixels when blurring the original pixel in an amount of four pixels by subjecting the original pixel to the bilinear interpolation blur processing four times, for example.

In FIG. 9A, the pixel value of the original pixel positioned at the blur center is "1" before the blur processing and is "4900/65536" after the blur processing. The pixel value of a pixel E1 positioned at the blur boundary is "70/65536" after the blur processing.

Suppose that the pixel value (a value) of the original pixel before the blur processing is "255", the results shown in FIG. 9B are obtained after omitting fractions less than one. Note that the values obtained after blurring the image in an amount of four pixels are smaller than the values shown in FIG. 9B, since fractions are omitted each time the blur processing (0.5 pixels) is performed.

In FIG. 9B, the pixel value of the original pixel positioned at the blur center becomes "255×4900/65536=19.0658 . . . =19" after the blur processing by omitting fractions less than one. The pixel value of the pixel E1 positioned at the blur boundary becomes "255×70/65536=0.2723 . . . =0" after the blur processing by omitting fractions less than one.

In the example shown in FIG. 9B, since the pixel values at the outermost periphery (blur boundary) are zero, the substantial blur length is three pixels, although the original pixel is expected to be blurred in an amount of four pixels. As described above, the actual blur length becomes less than the number of blur processing operations when repeatedly performing the blur processing, so that the blur efficiency is decreased. The blur efficiency is further decreased as the number of blur processing operations is increased.

In order to solve such a problem, one embodiment of the invention performs conversion processing by table conversion or the like in the middle of the blur processing so that the blur results are not decreased to a large extent.

Figure 10A:
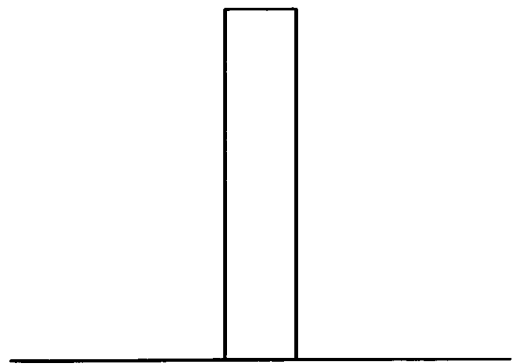
FIGS. 10A to 10D are diagrams illustrative of a blur processing method according to one embodiment of the invention.
Figure 10B:
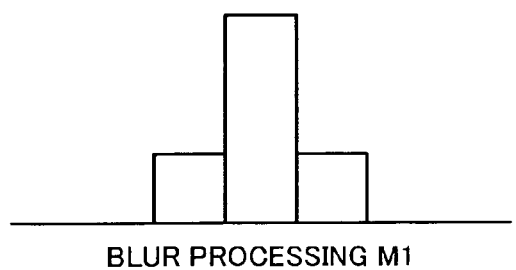

For example, when subjecting the original pixel shown in FIG. 10A to the first blur processing M1 (Kth blur processing in a broad sense), the pixel value of the original pixel moves to the adjacent pixels, as shown in FIG. 10B.

Figure 10C:
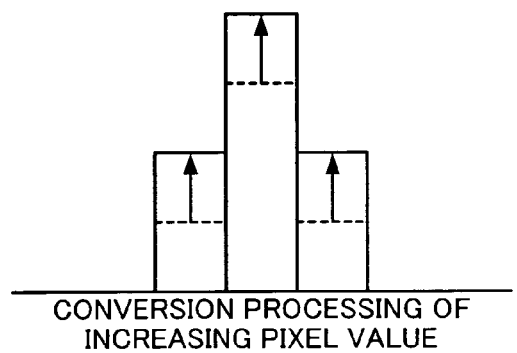
Figure 10D:
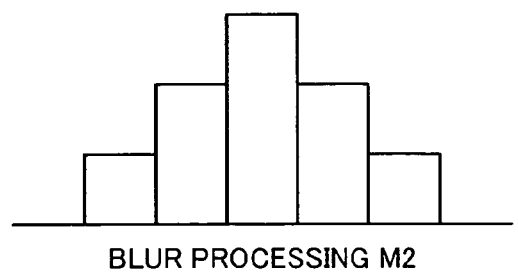

In one embodiment of the invention, conversion processing of increasing the pixel values of the blurred image obtained by the blur processing M1 is performed, as shown in FIG. 10C. In FIG. 10C, conversion processing of increasing the pixel value of the pixel of which the pixel value is larger than zero is performed, for example. As shown in FIG. 10D, the blurred image subjected to the conversion processing is subjected to the subsequent blur processing M2 ((K+1)th blur processing in a broad sense). Note that the conversion processing shown in FIG. 10C and the blur processing shown in FIG. 10D may be performed at the same time.

Figure 11A:
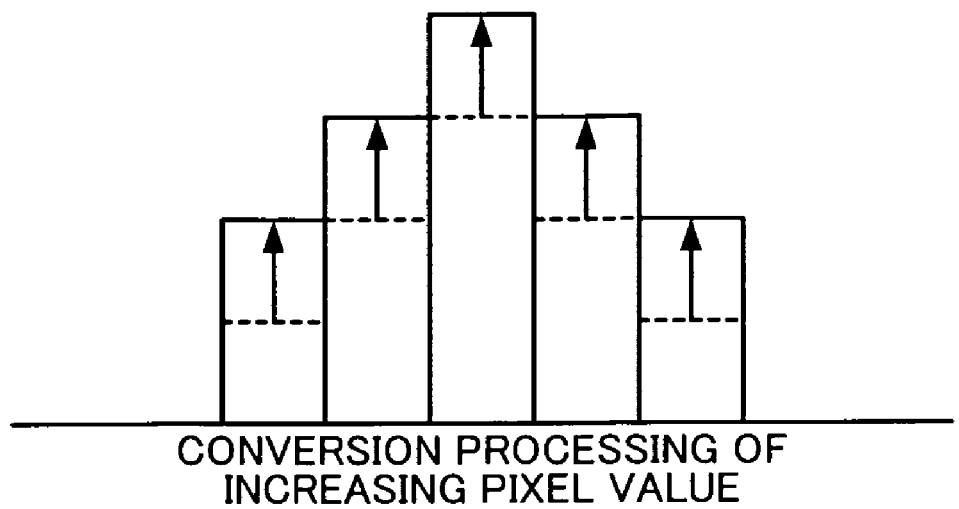
FIGS. 11A and 11B are diagrams illustrative of the blur processing method according to one embodiment of the invention.
Figure 11B:
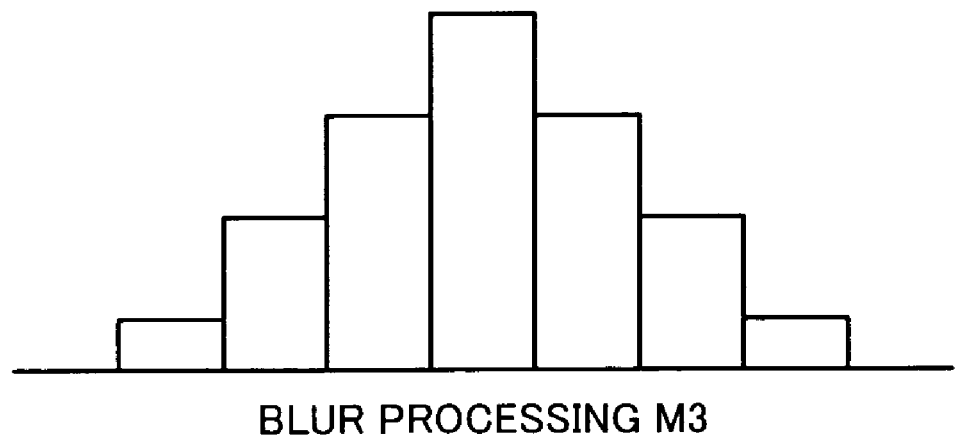

As shown in FIG. 11A, conversion processing of increasing the pixel values of the blurred image obtained by the blur processing M2 is performed. As shown in FIG. 11B, the blurred image subjected to the conversion processing is subjected to the subsequent blur processing M3 ((K+2)th blur processing in a broad sense).

Since the above-described method increases the pixel values of the blurred image after the blur processing, occurrence of a problem in which the pixel values at the boundary of the blurred image are decreased to zero, as shown in FIG. 9B, can be prevented. As a result, a blur length of N pixels can be obtained by repeatedly performing the blur processing N times, so that efficient blur processing can be realized. In particular, the method according to one embodiment of the invention becomes more advantageous over a known method as the number of blur processing operations is increased.

The first blur processing shown in FIG. 8B may be realized by the method shown in FIGS. 10A to 11B. The blur processing in which the amount of expansion (blur length) toward the outside of the blur target image is large can be realized by using the method shown in FIGS. 10A to 11B. The second blur processing shown in FIG. 8C may be realized by blur processing in which the conversion processing shown in FIGS. 10C and 11A is not performed, for example.

2.4 Shape of Glare Source

In one embodiment of the invention, a sphere, a disk, a triangle strip, or a triangle fan can be set as the shape of the glare source. Note that the shape of the glare source is not limited to these four shapes. Various modifications may be made.

FIG. 12 shows an example of the three-dimensional information (three-dimensional position/shape designation parameter) of the four glare sources and the drawing method in the glare processing (steps S3 and S5 in FIG. 2).

In the case of a spherical glare source, the three-dimensional information in the step S1 in FIG. 2 may be the center coordinates (world coordinate system) and the radius. The glare source is drawn in the steps S3 and S5 in FIG. 2 by drawing a disk billboard object contacting the front side (virtual camera side) of the sphere using a triangle fan.

Figure 13A:
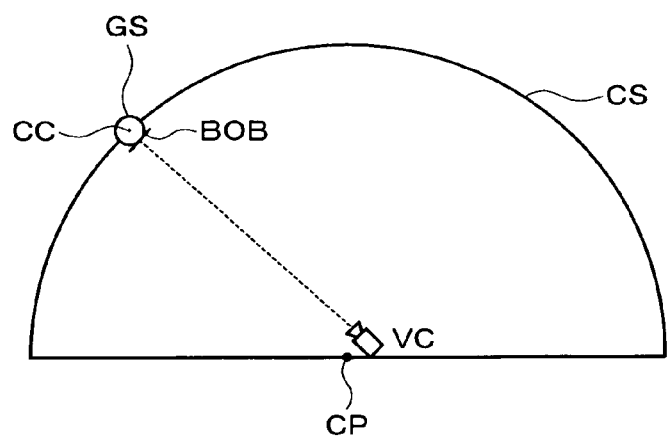
FIGS. 13A to 13C are diagrams illustrative of a spherical glare source.

In FIG. 13A, a spherical glare source GS representing the sun, moon, or the like is disposed in a celestial sphere CS. In this case, the glare source is drawn by using a disk billboard object BOB contacting the front side of the spherical glare source GS to generate a glare source image (first and second glare source images) viewed from a virtual camera VC. Specifically, the virtual camera VC is not necessarily positioned at a center point CP of the celestial sphere CS. Therefore, if the disk billboard object BOB is disposed at center coordinates CC of the glare source GS, the billboard object BOB enters (is lodged in) the celestial sphere CS, whereby the glare source image may be imperfectly seen. On the other hand, such a problem can be prevented by disposing the disk billboard object BOB as shown in FIG. 13A.

In FIG. 13A, the disk billboard object BOB is disposed at a position in contact with the spherical glare source GS. It suffices that the disk billboard object BOB be positioned at least closer to the virtual camera VC than the center coordinates CC of the glare source GS (and farther from the virtual camera VC than other objects).

Figure 13B:
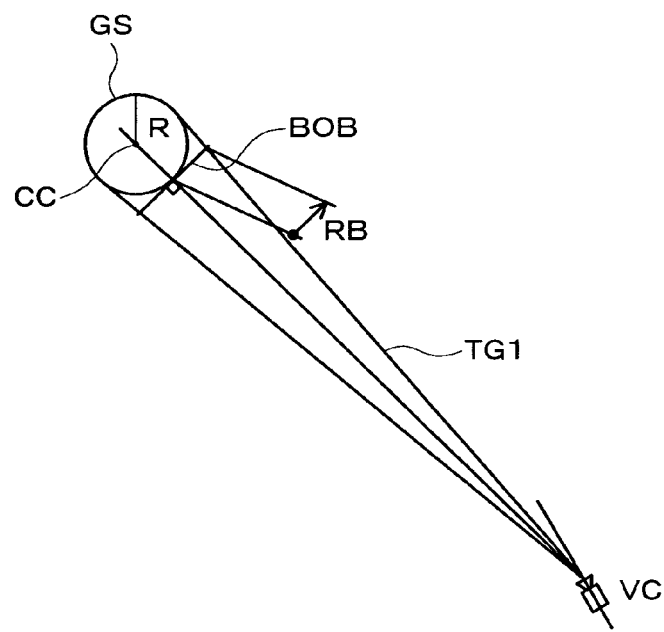

As shown in FIG. 13B, the size of the disk billboard object BOB may be set by calculating a tangent TG1 from the position of the virtual camera VC to the glare source GS. This enables a radius RB of the disk billboard object BOB to be set at an appropriate value corresponding to a radius R of the glare source GS.

As shown in FIG. 13B, the disk billboard object BOB is disposed as a billboard of which the surface is perpendicular to the virtual camera VC (billboard of which the surface is perpendicular to the straight line connecting the virtual camera VC and the center coordinates CC). As the disk billboard object BOB, a triangle fan as shown in FIG. 13C may be used.

Figure 14A:
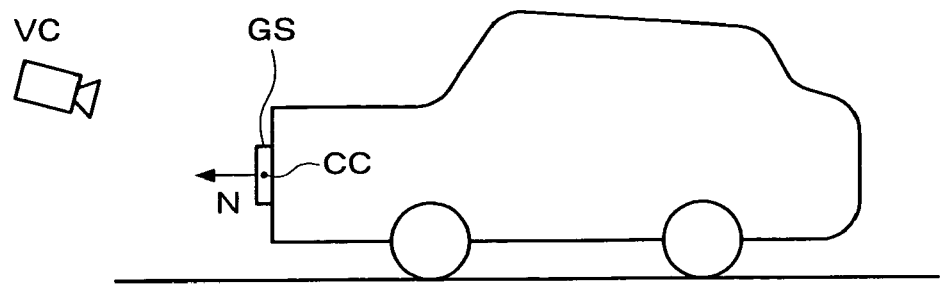
FIGS. 14A to 14C are diagrams illustrative of glare sources in the shape of a disk, triangle strip, and triangle fan.

A disk-shaped glare source GS may be used to express a glare effect of an automotive headlight as shown in FIG. 14A. In this case, a normal vector N indicating the orientation of the surface of the disk is used as the three-dimensional information of the glare source GS. The glare source image viewed from the virtual camera VC can be generated by disposing and drawing the disk object of which the orientation of the surface is set by the normal vector N in the object space (world coordinate system) at the center coordinates of the glare source GS. This allows the glare source image to change from a circle to an oval depending on the positional relationship between the virtual camera VC and the glare source GS, so that real image expression can be realized.

Figure 13C:
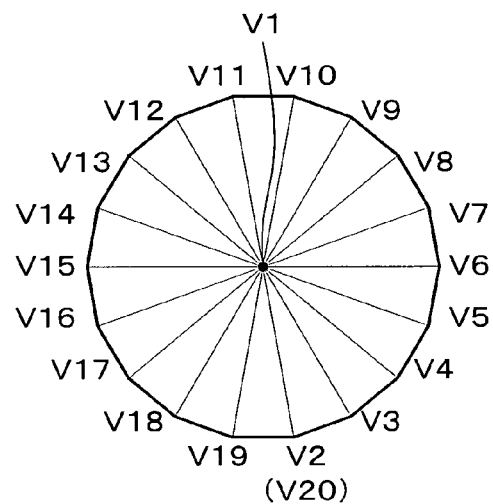
Figure 14B:
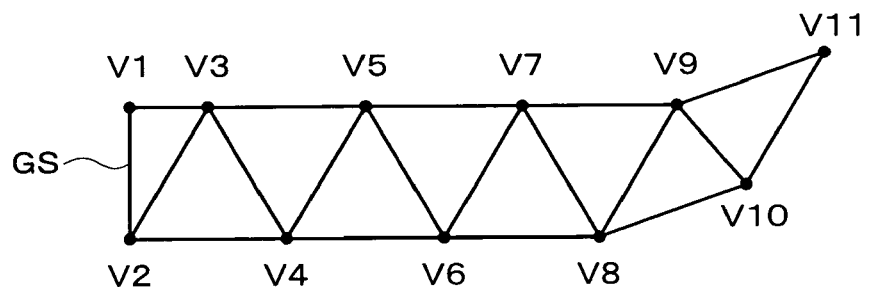
Figure 14C:
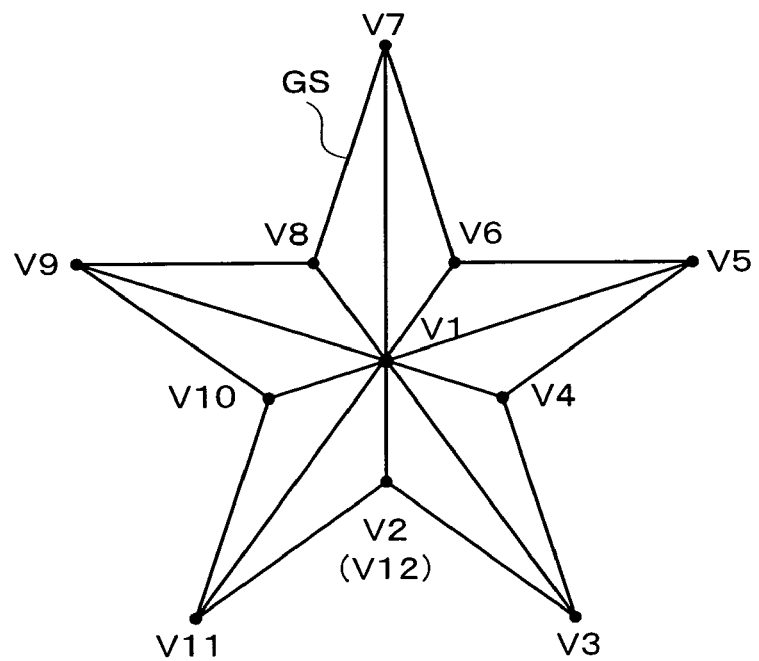

FIG. 14B is an example of the glare source in the shape of a triangle strip, and FIGS. 13C and 14C are examples of a glare source in the shape of a triangle fan. The triangle strip and the triangle fan are objects formed by a plurality of vertices (V1 to V20, V1 to V11, V1 to V12). The coordinates of the vertices (coordinates in the world coordinate system) make up the three-dimensional information of the glare source. The glare source image viewed from the virtual camera can be generated by disposing and drawing the object formed by these vertices in the object space, for example.

Figure 15A:
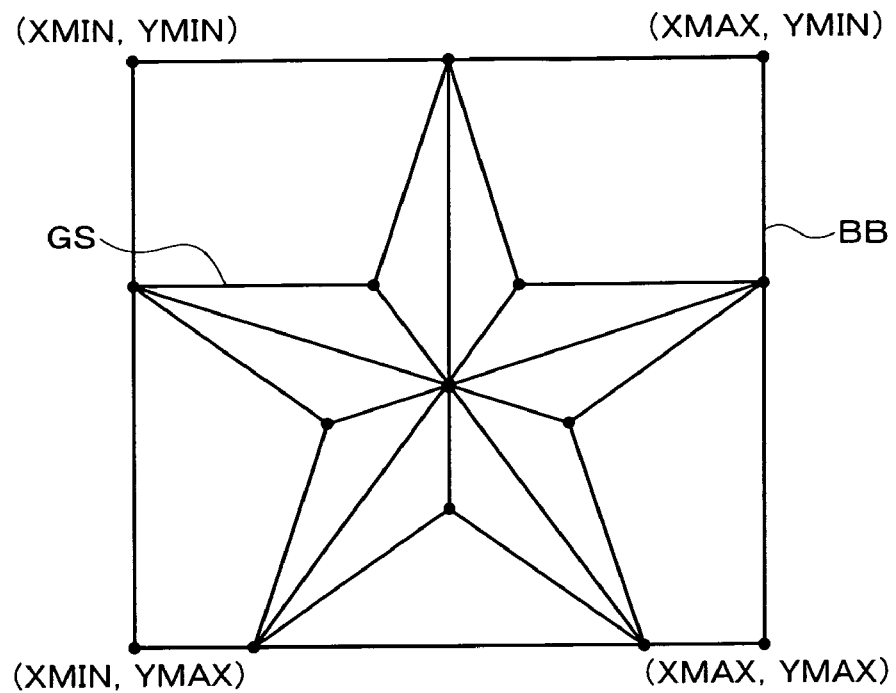
FIGS. 15A and 15B are diagrams illustrative of a bounding box.
Figure 15B:
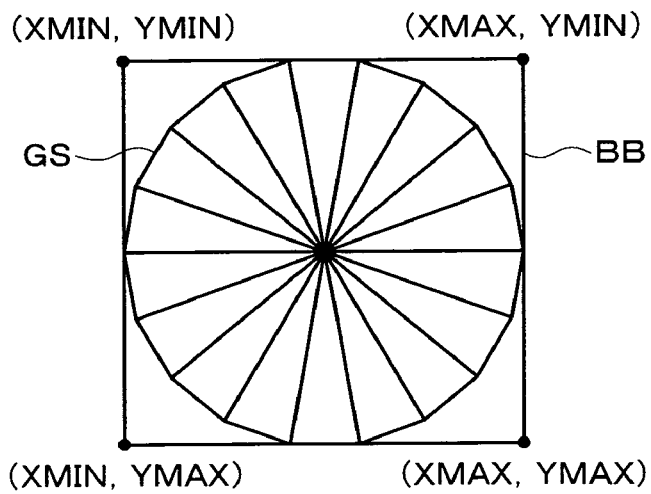

The area size may be determined in the step S2 in FIG. 2 by generating a bounding box which involves the glare source in the screen coordinate system based on the three-dimensional information of the glare source. FIGS. 15A and 15B show examples of a bounding box BB (bounding area). As shown in FIGS. 15A and 15B, the bounding box BB may be generated by calculating the X coordinates and the Y coordinates of the vertices of the glare source GS in the screen coordinate system, and calculating the minimum value XMIN and the maximum value XMAX of the X coordinates and the minimum value YMIN and the maximum value YMAX of the Y coordinates of the vertices.

2.5. Detailed Processing

The detailed procedure of the glare processing according to one embodiment of the invention is described below.

In one embodiment of the invention, the glare processing is performed according to the following procedure using the three-dimensional information (position/shape parameter) of the glare source, glare color information (e.g. white, yellow, or blue), and glare blur length information.

(1) Coordinate Transformation of Vertices of Glare Source

The coordinates of the vertices of the glare source in the screen coordinate system are calculated by coordinate transformation of the vertices of the glare source.

(2) Determining Processing Area

The bounding box of the processing area on the screen is determined as described with reference to FIGS. 15A and 15B from the vertex coordinates calculated in (1).

(3) Clearing Frame Buffer

As preprocessing before drawing the glare source, the a value in the drawing area (area calculated in (2)) on the frame buffer is cleared to zero.

(4) Drawing Glare Source (for Contrast)

The Z test is disabled, and the glare source is drawn on the frame buffer. The glare source is drawn on only the a plane, and the drawing color is set at "a=255", for example. This allows "a=255" to be written on the a plane in the area in which the glare source exists, and the second glare source image G2 (the second image H2 shown in FIG. 6 before the blur processing) is generated.

(5) Clearing Work Buffer WBUF1

The work buffer WBUF1 is allocated on the VRAM. The size of the work buffer WBUF1 is set taking into consideration the bounding box determined in (2) and the blur length due to scale-down processing and blur processing. The values R, G, B, and a plane of the work buffer WBUF1 are cleared to zero.

(6) Scale-Down Copying Second Glare Source Image G2

The second glare source image G2 is scaled down before the blur processing in order to increase the processing speed. Specifically, the second glare source image G2 generated in (4) is scaled down by ½ in length and width, and drawn on the a plane in the work buffer WBUF1.

(7) Clearing Work Buffer WBUF2

The work buffer WBUF2 used for the blur processing is allocated on the VRAM. The work buffer WBUF2 uses only the a plane. Since it is unnecessary to clear the entire area of the work buffer WBUF2, only the a values at the edge of the area are cleared to zero.

(8) Blur Processing

The image drawn in the work buffer WBUF1 in (6) is used as a texture, and a polygon (sprite) onto which the texture is mapped and which has the same size as the texture is drawn in the work buffer WBUF2. In this case, bilinear interpolation is performed by causing the pixel center to correspond to the center of four texels. Specifically, the texture coordinates are shifted, and the texture is mapped by the bilinear interpolation method (texel interpolation method). As a result, an image obtained by blurring the image drawn in the work buffer WBUF1 in an amount of 0.5 pixels is drawn in the work buffer WBUF2.

Then, the image drawn in the work buffer WBUF2 is used as a texture, and a polygon (sprite) onto which the texture is mapped and which has the same size as the texture is drawn in the work buffer WBUF1. In this case, the texture coordinates are shifted, and the texture is mapped by the bilinear interpolation method (texel interpolation method). As a result, an image obtained by blurring the image drawn in the work buffer WBUF2 in an amount of 0.5 pixels is drawn in the work buffer WBUF1.

The image drawn in the work buffer WBUF1 becomes an image obtained by blurring the glare source image (blur target image) in an amount of one pixel by performing the drawing processing from the work buffer WBUF1 to the work buffer WBUF2 and the drawing processing from the work buffer WBUF2 to the work buffer WBUF1. When a desired blur length is N pixels, the blur processing is repeatedly performed N times (N rounds).

(9) Storing Stencil

The blurred image of the second glare source image G2 has been drawn on the a plane of the work buffer WBUF1 by the above-described processing in a state in which the image is scaled down by ½. The image is scaled up to the original size to generate the second image H2 (stencil) which is the blurred image of the second glare source image G2. The generated second image H2 is stored on the G plane of the work buffer WBUF1.

(10) Clearing Frame Buffer

As preprocessing before drawing the glare source, the a value in the drawing area (area calculated in (2)) on the frame buffer is cleared to zero.

(11) Drawing Glare Source

The Z test is enabled, and the glare source is drawn on the frame buffer. The glare source is drawn on only the a plane, and the drawing color is set at "a=255", for example. This allows "a=255" to be written on the a plane in the area in which the glare source exists, and the first glare source image G1 (see FIG. 6) is generated. In this case, since the glare source is drawn after enabling the Z test, when an object such as the glare target object exists in front of the glare source, hidden surface removal is appropriately performed for the glare source.

(12) Cutting Stencil

The first glare source image G1 written on the a plane of the frame buffer is cut from the second image H2 (stencil) written on the G plane of the work buffer WBUF1. The cut processing corresponds to the above-described NOT processing of the first glare source image G1. This allows an image H2-G1 obtained by the NOT processing to be drawn on the G plane of the work buffer WBUF1.

(13) Clearing Work Buffer WBUF1

The value of the a plane of the work buffer WBUF1 is cleared to zero.

(14) Scale-Down Copying First Glare Source Image G1

The first glare source image G1 is scaled down before the blur processing in order to increase the processing speed. Specifically, the first glare source image G1 generated in (11) is scaled down by ½ in length and width, and drawn on the a plane in the work buffer WBUF1.

(15) Clearing Work Buffer WBUF2

The a value at the edge of the area of the work buffer WBUF2 is cleared to zero.

(16) Blur Processing

The first glare source image G1 written on the a plane of the work buffer WBUF1 is subjected to the blur processing in the same manner as in (8) and (9) to generate the first image H1. In this case, the first image H1 which is the blurred image of the first glare source image G1 is generated by the method described with reference to FIGS. 10A to 11B in order to increase the efficiency of the blur processing.

(17) Moving Stencil

The image H2-G1 (stencil) drawn on the G plane of the work buffer WBUF1 is copied to the a plane of the frame buffer.

(18) Drawing Contrast

In this stage, the first image H1 shown in FIG. 6 has been drawn on the a plane of the work buffer WBUF1. The image H2-G1 has been drawn on the a plane of the frame buffer. The contrast is drawn by performing the image calculation processing expressed by "H1*(H2−G1)=(H1*H2)-G1" using these images to blend the sprite in the glare color into the frame buffer by subtractive a blending (subtractive drawing).

Figure 16:
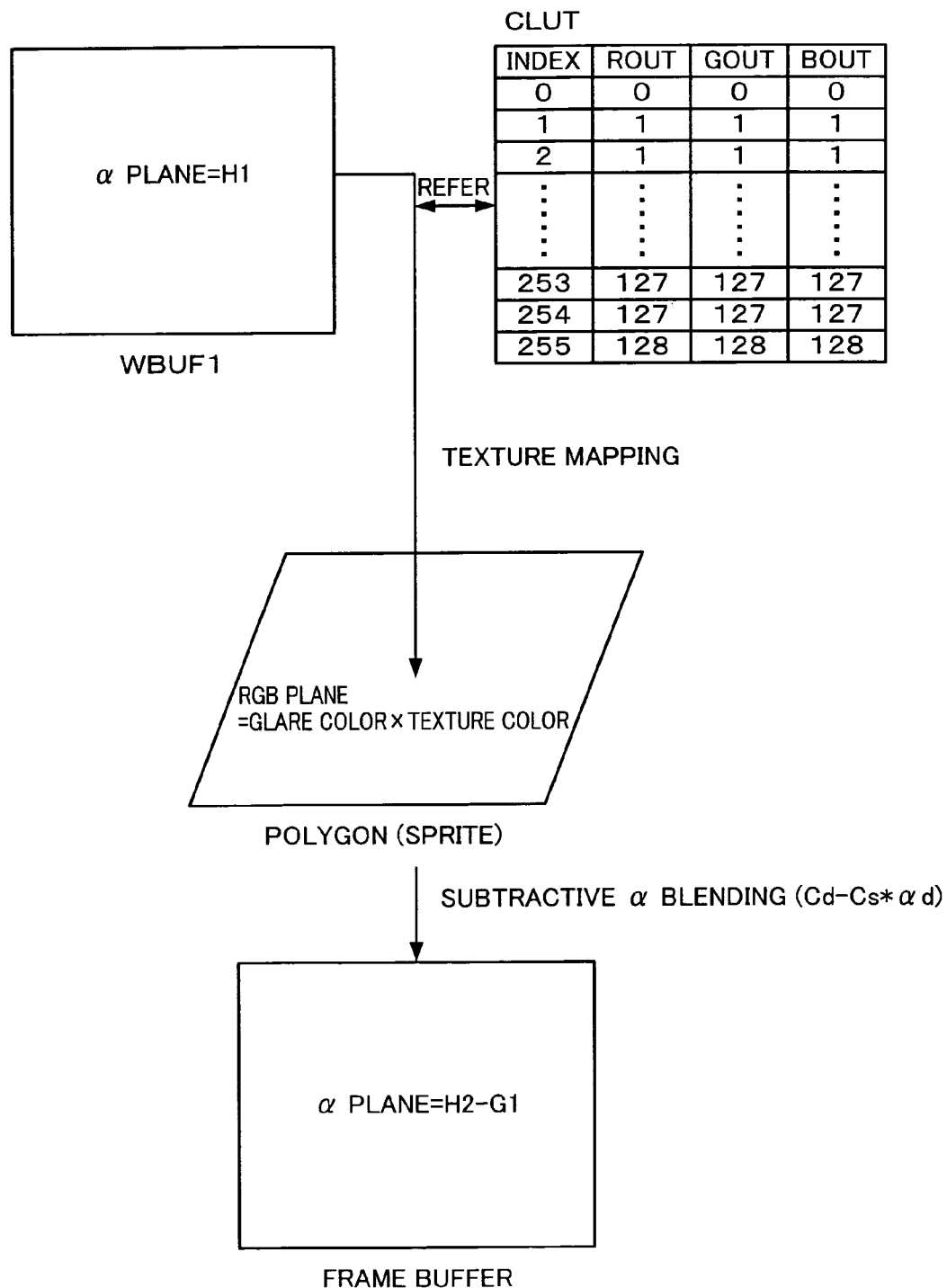
FIG. 16 is a diagram illustrative of processing using index color texture mapping.

In more detail, as shown in FIG. 16, the information of the first image H1 on the a plane of the work buffer WBUF1 is set as an index number of the index color texture mapping lookup table (CLUT). A polygon (sprite) onto which the texture to which the index number is set is mapped and of which the color (vertex color) is set in the glare color is drawn in the frame buffer in which the image H2-G1 is drawn on the a plane by subtractive a blending (Cd−Cs*ad). Note that Cd is a destination color (RGB of the frame buffer). Cs is a source color (color of the polygon), and is a color obtained by multiplying the polygon vertex color (glare color) by the texture color (color determined by the index value and CLUT). ad is the destination a value (a value of the frame buffer). This allows the glare contrast to be drawn on the RGB plane of the frame buffer in which the original image is drawn.

The blurred image (H1) may be converted using a conversion table, and the contrast may be drawn based on the original image and the blurred image (H1) after the conversion processing. In more detail, since the lookup table CLUT functions as the conversion table for conversion from the a value to the texture color, the contrast drawing can be adjusted by changing the lookup table CLUT.

(19) Generating Glare Expression Image

The blurred image (H1) of the first glare source image G1 has been drawn on the a plane of the work buffer WBUF1. The information (a value) of the blurred image is set as the index number of the index color texture mapping lookup table (CLUT). A polygon (sprite) onto which the texture to which the index number is set is mapped and of which the color (vertex color) is set in the glare color is drawn in the frame buffer by additive a blending.

A glare expression image is completed by the above-described processing. For example, when the glare color is set to white, an image is generated in which a white light glare effect is expressed. When the glare color is set to yellow, an image is generated in which a yellow light glare effect is expressed. The blurred image (H1) may be converted using a conversion table, and the glare expression image may be generated based on the original image and the blurred image (H1) after the conversion processing. In more detail, since the lookup table CLUT functions as the conversion table for conversion from the a value to the texture color, the glare can be adjusted by changing the lookup table CLUT.

3. Hardware Configuration

Figure 17:
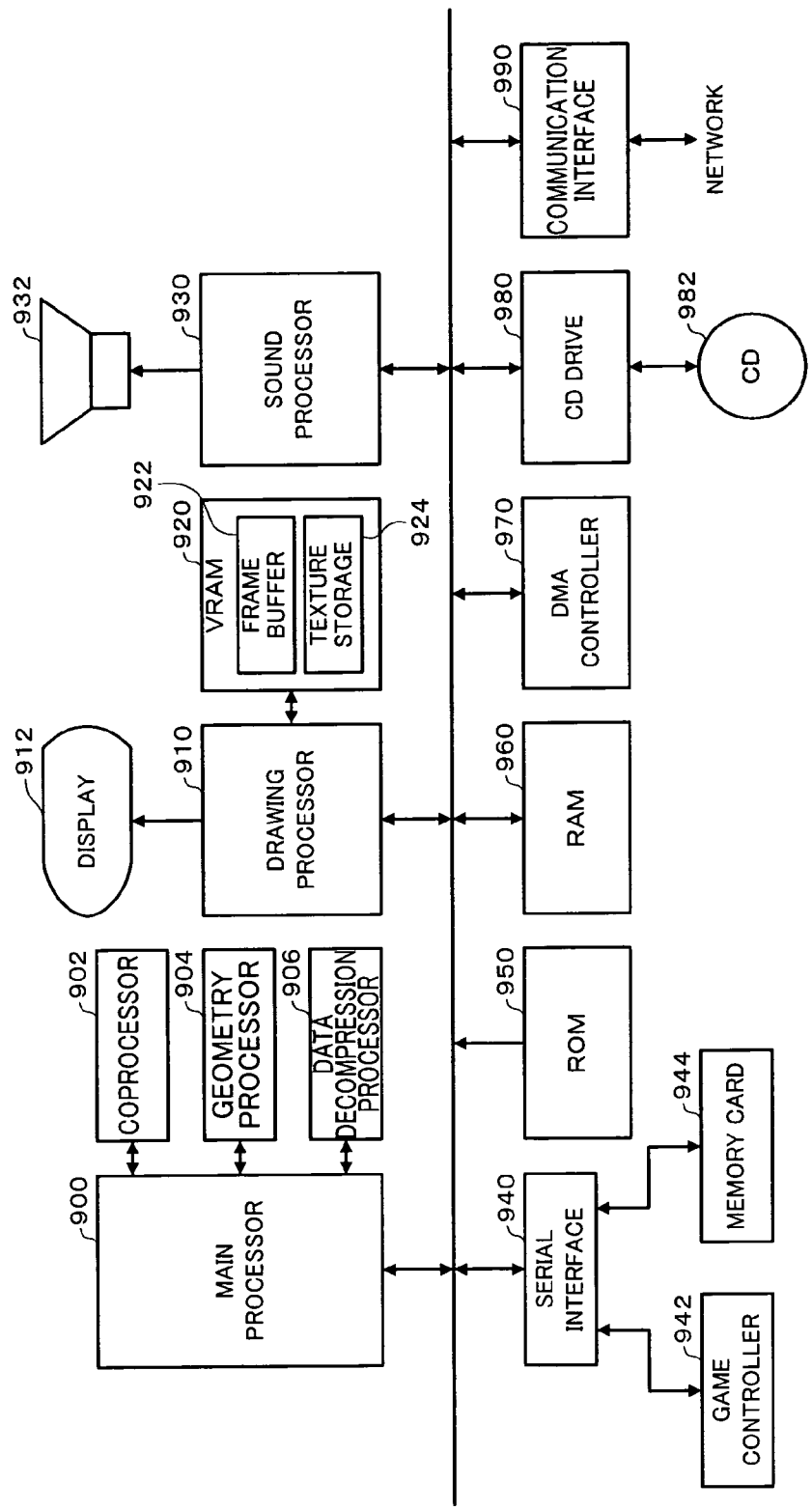
FIG. 17 is a hardware configuration example.

FIG. 17 shows a hardware configuration example which can realize one embodiment of the invention. A main processor 900 operates based on a program stored in a CD 982 (information storage medium), a program downloaded through a communication interface 990, a program stored in a ROM 950, or the like, and performs game processing, image processing, sound processing, or the like. A coprocessor 902 assists the processing of the main processor 900, and performs matrix calculation (vector calculation) at high speed. In the case where matrix calculation is necessary for physical simulation to cause an object to move or make motion, a program which operates on the main processor 900 directs (requests) the coprocessor 902 to perform the processing.

A geometry processor 904 performs geometric processing such as a coordinate transformation, perspective transformation, light source calculation, or curved surface generation based on instructions from a program operating on the main processor 900, and performs a matrix calculation at high speed. A data decompression processor 906 decodes compressed image data or sound data, or accelerates the decoding of the main processor 900. This enables a motion picture compressed according to the MPEG standard or the like to be displayed in an opening screen or a game screen.

A drawing processor 910 draws (renders) an object formed by a primitive surface such as a polygon or a curved surface. When drawing an object, the main processor 900 delivers drawing data to the drawing processor 910 by utilizing a DMA controller 970, and transfers a texture to a texture storage section 924, if necessary. The drawing processor 910 draws an object in a frame buffer 922 based on the drawing data and the texture while performing hidden surface removal utilizing a Z buffer or the like. The drawing processor 910 also performs a blending (translucent processing), depth queuing, MIP mapping, fog processing, bilinear filtering, trilinear filtering, anti-aliasing, shading processing, or the like. When the image of one frame has been written into the frame buffer 922, the image is displayed on a display 912.

A sound processor 930 includes a multi-channel ADPCM sound source or the like, generates game sound such as background music (BGM), effect sound, or voice, and outputs the generated game sound through a speaker 932. Data from a game controller 942 or a memory card 944 is input through a serial interface 940.

A system program or the like is stored in the ROM 950. In the case of an arcade game system, the ROM 950 functions as an information storage medium, and various programs are stored in the ROM 950. A hard disk may be used instead of the ROM 950. A RAM 960 functions as a work area for various processors. The DMA controller 970 controls DMA transfer between the processor and the memory. A CD drive 980 accesses a CD 982 in which a program, image data, sound data, or the like is stored. The communication interface 990 performs data transfer with the outside through a network (communication line or high-speed serial bus).

The processing of each section (each means) according to one embodiment of the invention may be entirely realized by only hardware, or may be realized by a program stored in the information storage medium or a program distributed through the communication interface. Or, the processing of each section may be realized by hardware and a program.

In the case of realizing the processing of each section according to one embodiment of the invention by hardware and a program, a program for causing the hardware (computer) to function as each section according to one embodiment of the invention is stored in the information storage medium. In more detail, the program directs each of the processors 902, 904, 906, 910, and 930 (hardware) to perform the processing, and transfers data to the processors, if necessary. The processors 902, 904, 906, 910, and 930 realize the processing of each section according to one embodiment of the invention based on the instructions and the transferred data.

The present invention is not limited to the above-described embodiments, and various modifications can be made within the scope of the invention. Any term (such as a frame buffer and work buffer) cited with a different term having broader or the same meaning (such as a drawing area and drawing buffer) at least once in this specification and drawings can be replaced by the different term in any place in this specification and drawings.

The glare source drawing method, the image calculation method, the type of glare source, and the blur processing are not limited to those described relating to the above-described embodiments. Methods equivalent to the above-described methods are also included within the scope of the invention. For example, the blur processing may be realized by a method differing from the method described with reference to FIGS. 10A to 11B. A glare source differing from the glare sources illustrated in FIG. 12 may be set.

The invention may be applied to various games. The invention may be applied to various image generation systems, such as an arcade game system, consumer game system, large-scale attraction system in which a number of players participate, simulator, multimedia terminal, system board which generates a game image, and portable telephone.

Although only some embodiments of the present invention have been described in detail above, those skilled in the art will readily appreciate that many modifications are possible in the embodiments without materially departing from the novel teachings and advantages of this invention. Accordingly, all such modifications are intended to be included within scope of this invention.

What is claimed is:

1. A computer-readable storage medium encoded with a computer program which, when executed by a computer, causes the computer to function as:
   a glare source drawing section which draws a glare source while referring to a Z value of an original image stored in a Z buffer to generate a first glare source image, and draws the glare source without referring to the Z value of the original image stored in the Z buffer to generate a second glare source image;
   a glare correction image generation section which performs image calculation processing including AND processing of a first image which is an image obtained by subjecting the first glare source image to first blur processing and a second image which is one of an image obtained by subjecting the second glare source image to second blur processing and the second glare source image to generate a glare correction image; and
   a glare expression image generation section which generates a glare expression image in which a corrected glare effect is expressed in the original image based on the original image, the blurred image of the first glare source image, and the glare correction image.

2. The computer-readable storage medium as defined in claim 1, wherein the glare correction image generation section performs the image calculation processing including NOT processing of the first glare source image to generate the glare correction image.

3. The computer-readable storage medium as defined in claim 2, wherein the first blur processing and the second blur processing are different types of blur processing.

4. The computer-readable storage medium as defined in claim 3, wherein the first blur processing is blur processing in which an amount of expansion of a blurred image with respect to a blur target image is larger than an amount of expansion of the second blur processing.

5. The computer-readable storage medium as defined in claim 3, wherein the first blur processing includes a plurality of blur processing, in which pixel values of a blurred image obtained by the Kth (K is a natural number) blur processing are subjected to conversion processing, and the subsequent (K+1)th blur processing is performed for the blurred image subjected to the conversion processing.

6. The computer-readable storage medium as defined in claim 1, wherein the first blur processing and the second blur processing are different types of blur processing.

7. The computer-readable storage medium as defined in claim 6, wherein the first blur processing is blur processing in which an amount of expansion of a blurred image with respect to a blur target image is larger than an amount of expansion of the second blur processing.

8. The computer-readable storage medium as defined in claim 7, wherein the first blur processing includes a plurality of blur processing, in which pixel values of a blurred image obtained by the Kth (K is a natural number) blur processing are subjected to conversion processing, and the subsequent (K+1)th blur processing is performed for the blurred image subjected to the conversion processing.

9. The computer-readable storage medium as defined in claim 7, the program causing the computer to function as:
   a three-dimensional information storage section which stores three-dimensional information of the glare source; and an area size determination section which determines an area size of a blur processing area based on the three-dimensional information of the glare source, wherein the glare correction image generation section performs the blur processing of the glare source image in the blur processing area set by the area size.

10. The computer-readable storage medium as defined in claim 9, wherein the three-dimensional information storage section stores center coordinates and a radius of a spherical glare source as the three-dimensional information; and wherein the glare source drawing section generates the glare source image by drawing a disk billboard object disposed at a position in front of the center coordinates when viewed from a virtual camera.

11. The computer-readable storage medium as defined in claim 9, wherein the three-dimensional information storage section stores center coordinates, radius, and normal vector indicating surface orientation of a disk-shaped glare source as the three-dimensional information; and wherein the glare source drawing section generates the glare source image by drawing a disk object which is disposed at the center coordinates and of which surface orientation is set by the normal vector.

12. The computer-readable storage medium as defined in claim 9, wherein the three-dimensional information storage section stores a plurality of vertex coordinates of the glare source as the three-dimensional information; and wherein the glare source drawing section generates the glare source image by drawing an object formed by vertices at the vertex coordinates.

13. The computer-readable storage medium as defined in claim 9, wherein the area size determination section determines the size of the blur processing area by generating a bounding box which involves the glare source in a screen coordinate system based on the three-dimensional information of the glare source.

14. The computer-readable storage medium as defined in claim 6, wherein the first blur processing includes a plurality of blur processing, in which pixel values of a blurred image obtained by the Kth (K is a natural number) blur processing are subjected to conversion processing, and the subsequent (K+1)th blur processing is performed for the blurred image subjected to the conversion processing.

15. The computer-readable storage medium as defined in claim 14, the program causing the computer to function as:

a three-dimensional information storage section which stores three-dimensional information of the glare source; and an area size determination section which determines an area size of a blur processing area based on the three-dimensional information of the glare source, wherein the glare correction image generation section performs the blur processing of the glare source image in the blur processing area set by the area size.

16. The computer-readable storage medium as defined in claim 1, the program causing the computer to function as:

a three-dimensional information storage section which stores three-dimensional information of the glare source; and an area size determination section which determines an area size of a blur processing area based on the three-dimensional information of the glare source, wherein the glare correction image generation section performs the blur processing of the glare source image in the blur processing area set by the area size.

17. The computer-readable storage medium as defined in claim 16, wherein the three-dimensional information storage section stores center coordinates and a radius of a spherical glare source as the three-dimensional information; and wherein the glare source drawing section generates the glare source image by drawing a disk billboard object disposed at a position in front of the center coordinates when viewed from a virtual camera.

18. The computer-readable storage medium as defined in claim 16, wherein the three-dimensional information storage section stores center coordinates, radius, and normal vector indicating surface orientation of a disk-shaped glare source as the three-dimensional information; and wherein the glare source drawing section generates the glare source image by drawing a disk object which is disposed at the center coordinates and of which surface orientation is set by the normal vector.

19. The computer-readable storage medium as defined in claim 16, wherein the three-dimensional information storage section stores a plurality of vertex coordinates of the glare source as the three-dimensional information; and wherein the glare source drawing section generates the glare source image by drawing an object formed by vertices at the vertex coordinates.

20. The computer-readable storage medium as defined in claim 16, wherein the area size determination section determines the size of the blur processing area by generating a bounding box which involves the glare source in a screen coordinate system based on the three-dimensional information of the glare source.

21. An image generation system which generates an image, the system comprising:

a glare source drawing section which draws a glare source while referring to a Z value of an original image stored in a Z buffer to generate a first glare source image, and draws the glare source without referring to the Z value of the original image stored in the Z buffer to generate a second glare source image;

a glare correction image generation section which performs image calculation processing including AND processing of a first image which is an image obtained by subjecting the first glare source image to first blur processing and a second image which is one of an image obtained by subjecting the second glare source image to second blur processing and the second glare source image to generate a glare correction image; and a glare expression image generation section which generates a glare expression image in which a corrected glare effect is expressed in the original image based on the original image, the blurred image of the first glare source image, and the glare correction image.

* * * * *